(12) United States Patent
Hart et al.

(10) Patent No.: US 7,161,896 B1
(45) Date of Patent: Jan. 9, 2007

(54) CHANNEL ESTIMATION IN A MULTICARRIER RADIO RECEIVER

(75) Inventors: Brian Hart, Wollstonecraft (AU); John D O'Sullivan, Hunters Hill (AU)

(73) Assignee: Cisco Systems Wireless Networking (Australia) Pty Limited, North Sydney (AU)

(*) Notice: Subject to any disclaimer, the term of this patent is extended or adjusted under 35 U.S.C. 154(b) by 1081 days.

(21) Appl. No.: 10/217,117

(22) Filed: Aug. 12, 2002

(51) Int. Cl.
*H04K 1/10* (2006.01)
*H04L 27/28* (2006.01)

(52) U.S. Cl. ............... 370/206; 370/210; 375/232; 375/260; 375/349; 375/350; 455/60

(58) Field of Classification Search ........ 370/206, 370/210; 375/232, 260, 349, 350; 455/60
See application file for complete search history.

(56) References Cited

U.S. PATENT DOCUMENTS

| | | | |
|---|---|---|---|
| 5,912,876 A | 6/1999 | H'miny | 370/210 |
| 5,963,592 A | 10/1999 | Kim | 375/232 |
| 5,973,642 A | 10/1999 | Li et al. | 342/378 |
| 6,141,393 A | 10/2000 | Thomas et al. | 375/347 |
| 6,298,035 B1 | 10/2001 | Heiskala | 370/206 |
| 6,327,314 B1 | 12/2001 | Cimini, Jr. et al. | 375/340 |
| 6,487,253 B1 | 11/2002 | Jones, IV et al. | 375/260 |
| 6,608,863 B1* | 8/2003 | Onizawa et al. | 375/232 |
| 6,721,569 B1* | 4/2004 | Hashem et al. | 455/450 |
| 6,795,392 B1* | 9/2004 | Li et al. | 370/210 |
| 6,990,061 B1* | 1/2006 | Deneire et al. | 370/210 |
| 7,010,049 B1* | 3/2006 | Jones et al. | 375/259 |
| 7,012,966 B1* | 3/2006 | Li | 375/267 |
| 7,054,354 B1* | 5/2006 | Gorokhov et al. | 375/148 |
| 7,082,159 B1* | 7/2006 | Larsson | 375/224 |
| 2002/0146078 A1* | 10/2002 | Gorokhov et al. | 375/260 |
| 2002/0181549 A1* | 12/2002 | Linnartz et al. | 375/142 |

(Continued)

FOREIGN PATENT DOCUMENTS

WO WO 98/09385 3/1998

OTHER PUBLICATIONS

Ye (Geoffrey) Li, Leonard J. Cimini, Jr., and Nelson R. Sollenberger, "Robust Channel Estimation for OFDM Systems with Rapid Dispersive Fading Channels", *IEEE Transactions on Communications*, vol. 46, No. 7, Jul. 1998.

(Continued)

*Primary Examiner*—Alpus H. Hsu
(74) *Attorney, Agent, or Firm*—Dov Rosenfeld Inventek

(57) ABSTRACT

A method and apparatus for estimating channel characteristics in a multicarrier wireless receiver such as an OFDM wireless receiver. The method includes determining a channel estimate for each of a set of subcarriers by receiving multicarrier data as a result of a wireless transmission of data that includes a known signal, wherein the determining uses a part of the received data that corresponds to the known signal. The method further includes smoothing the channel estimates according to a smoothing filter to form smoothed channel estimates. The smoothed channel estimate for a particular subcarrier includes a contribution from the channel estimates of the particular subcarrier's one or more immediate neighbors to take advantage of correlation that may exist between the particular subcarrier's channel and the channels of that subcarrier's one or more immediate neighbors. In one version, the transmitted data includes at least one additional known signal, and each smoothed channel estimate is a smoothed version of the average of sets of channel estimates. In such a version, each set of channel estimates is determined using a respective part of the received data that corresponds to a corresponding one of the known signals.

104 Claims, 9 Drawing Sheets

U.S. PATENT DOCUMENTS

2002/0181625 A1* 12/2002 Gorokhov et al. .......... 375/346

OTHER PUBLICATIONS

Vittoria Mignone and Alberto Morello, "CD3-OFDM: A Novel Demodulation Scheme for Fixed and Mobile Receivers", *IEEE Transactions on Communications*, vol. 44, No. 9, Sep. 1996.

Ye (Geoffrey) Li, "Simplified Channel Estimation for OFDM Systems with Multiple Transmit Antennas", *IEEE Transactions on Wireless Communications*, vol. 1, No. 1, Jan. 2002.

Juha Heiskala and John Terry: *OFDM Wireless LANs: A Theoretical and Practical Guide* (ISBN: 0672321572) Publisher: Sams Publishing, 2002. Chapter 2, p. 81: "Enhancing the Channel Estimate", and Chapter 2, p. 84: bibliography for Chapter 2.

* cited by examiner

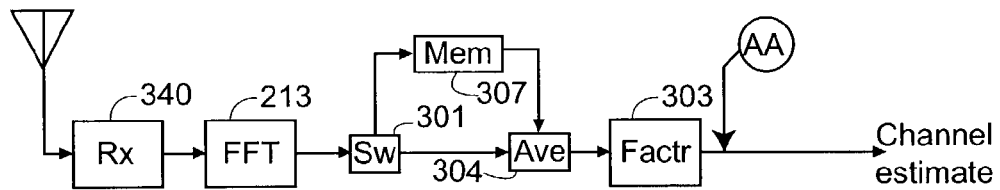
FIG. 3A (Prior Art)
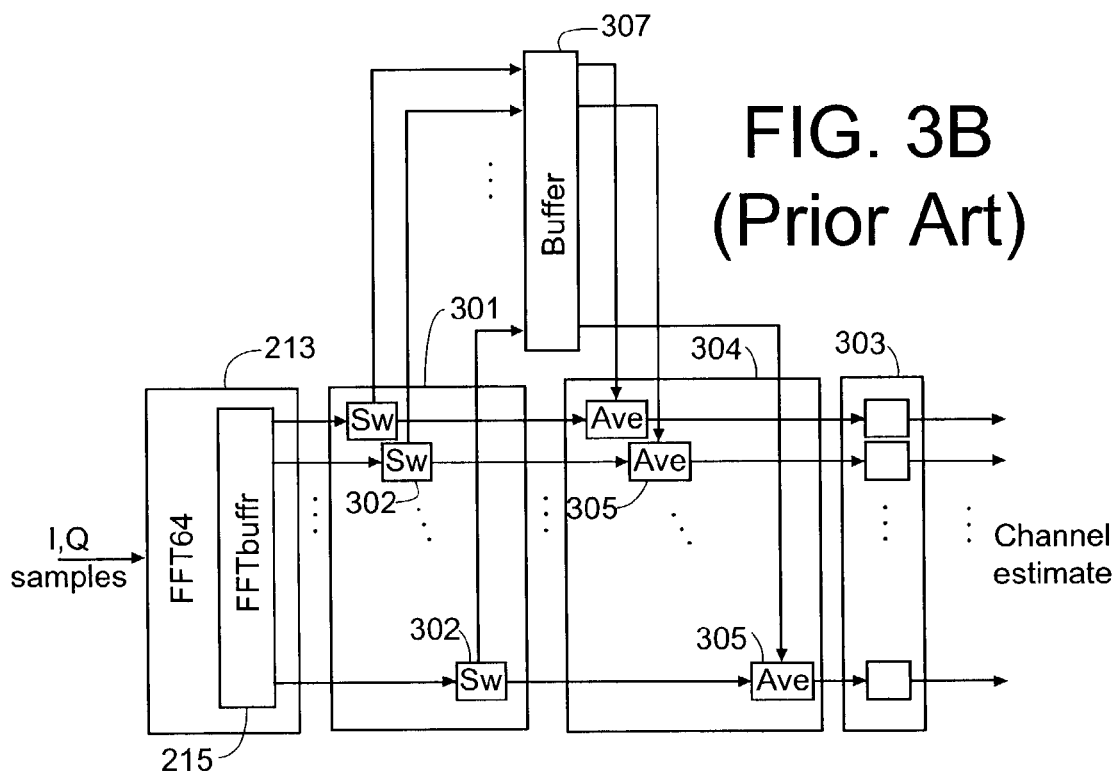

accepting one or more sets of received signal samples corresponding to each of the one or more known signals;

determining the set of subcarriers corresponding to the known signal or signals;

determining a rough channel response for each subcarrier by factoring out the known signal or signals from the determined subcarriers;

filtering the rough channel estimates using a smoothing filter to form smoothed rough channel estimates;

averaging to determine the channel estimates.

FIG. 6

CHANNEL ESTIMATION IN A MULTICARRIER RADIO RECEIVER

BACKGROUND

This invention is related to wireless communication, and in particular to an apparatus and method for channel estimation in a wireless receiver of a wireless data communication system that uses orthogonal frequency division multiplexing (OFDM).

BACKGROUND

Wireless transmissions such as wireless data transmissions are distorted in transit by the radio channel, i.e., distorted versions of the transmitted signals are typically received at a wireless receiver. Equalization is a term that refers to the measures taken to reduce the distortion effects in a radio channel, and this typically requires estimating the channel or its inverse. The IEEE 802.11a standard for wireless local area networks uses orthogonal frequency division multiplexing (OFDM) and data packets that each include a preamble that provides for channel estimation in a receiver. The preamble contains known symbols, including ten "short" symbols followed by two known "long" symbols. Prior art channel estimation includes averaging the two estimates of the channel obtained from the two consecutive long symbols, and then compensating for the effects of the channel using the average. Noise and other factors reduce the quality of this channel estimate, and such quality reduction lowers the quality of subsequent communication, e.g., the bit error rate (BER) and/or the packet error rate (PER). Other IEEE 802.11 OFDM standards, e.g., IEEE 802.11g are similar to the IEEE 802.11 standard. Thus there is a need for improved channel estimation, and in particular, for improved channel estimation for a receiver that uses OFDM and that conforms to the IEEE 802.11 OFDM standards.

SUMMARY

Disclosed herein is a method and apparatus for estimating channel characteristics in a multicarrier wireless receiver such as an OFDM wireless receiver. The method includes determining a channel estimate for each of a set of subcarriers by receiving multicarrier data as a result of a wireless transmission of data that includes a known signal, wherein the determining uses a part of the received signal that corresponds to the known signal. The method further includes smoothing the channel estimates according to a smoothing filter to form smoothed channel estimates. The smoothed channel estimate for a particular subcarrier includes a contribution from the channel estimates of the particular subcarrier's one or more immediate neighbors to take advantage of correlation that may exist between the particular subcarrier's channel and the channels of that subcarrier's one or more immediate neighbors. In one version, the transmitted data includes at least one additional known signal, and each smoothed channel estimate is a smoothed version of the average of sets of channel estimates. In such a version, each set of channel estimates is determined using a part of the received signal that corresponds to a corresponding one of the known signals.

BRIEF DESCRIPTION OF THE DRAWINGS

FIG. 3A shows a prior art channel estimator that uses two long symbols of the preamble of a packet that conforms to the IEEE 802.11 standard.

FIG. 3B shows a parallel version of the prior art channel estimator of FIG. 3A.

FIG. 6 shows simplified pseudocode for a method embodiment of the invention.

DETAILED DESCRIPTION

The invention describes a method and apparatus for channel estimation in a multicarrier radio receiver, in particular, a radio receiver that uses orthogonal frequency division modulation (OFDM). In a multicarrier radio transmitter, including an OFDM radio transmitter, a signal for transmission is split into a set of subcarriers (also called "tones"), and each transmitted via the channel. At the receiving end, the various subcarriers are combined to construct the received signal. An OFDM transmitter typically uses the inverse discrete Fourier transform (IDFT), typically implemented as an inverse Fast Fourier Transform (IFFT), to form the subcarriers for transmission, and an OFDM receiver typically uses the forward discrete Fourier transform (DFT), typically implemented as a Fast Fourier Transform (FFT) to form the signal from the received subcarriers. Each of the subcarriers experiences a slightly different channel. One aspect of the invention is to carry out channel estimation in a radio receiver for receiving multicarrier signals by estimating the phase and amplitude response experienced by each of the subcarriers of a multicarrier signal. One aspect of the invention is to exploit any correlation that the channel response of one subcarrier has to the channel response of one or more of the adjacent subcarriers. In a channel that can be accurately modeled as an additive Gaussian noise channel, the channels for all the subcarriers are correlated. In a fading channel, there may be some correlation between the channel for one subcarrier and those for one or more of its adjacent subcarriers.

Figure 1A:
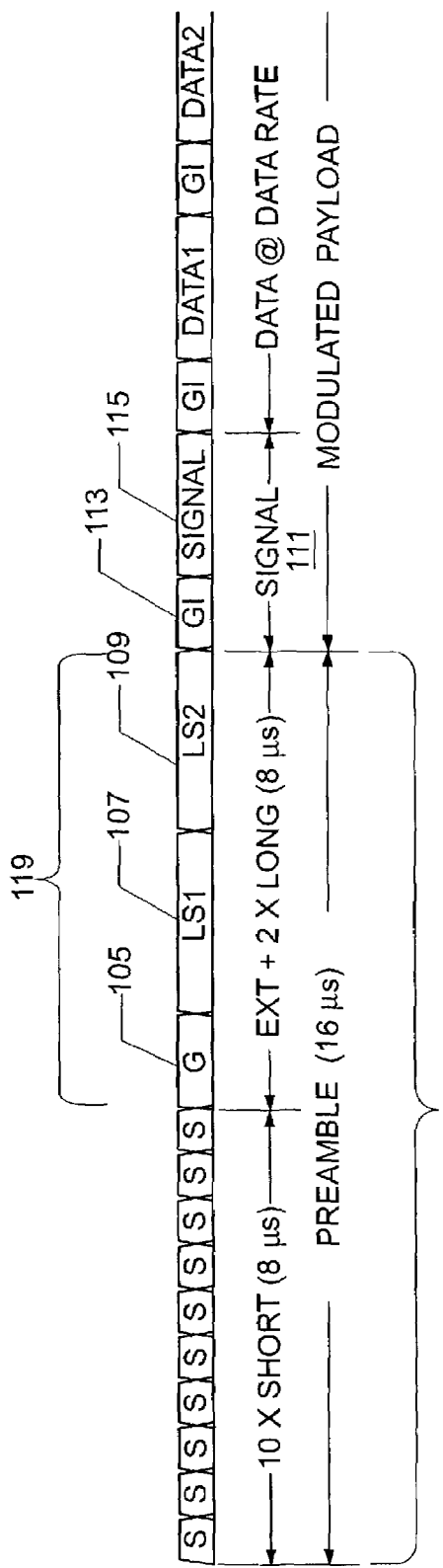
FIG. 1A shows a typical OFDM packet that conforms to the IEEE 802.11a standard and that includes a preamble with a short and a long preamble period that precede the signal payload.

FIG. 1 shows the structure of an OFDM packet as used in IEEE 802.11a WLANs. The packet starts with a preamble 101 provided for start of packet (SOP) detection, automatic gain control (AGC), diversity selection when diversity is used, for various other synchronization functions, and for channel estimation. The preamble is followed by the modulated payload, which starts with a known (low) data rate SIGNAL field 111 that provides information about the packet, followed by DATA fields at a rate specified in the signal field. Each data field includes a guard interval (cyclic extension).

The preamble 101 is 16 μs long and has two 8 μs parts: a first part ("short preamble part") consisting of set of 10 short symbols, and a second part ("long preamble part") 119 consisting of two long symbols 107 and 109, and a cyclic extension part (guard interval) 105. In a typical system, the short preamble part provides for SOP detection, AGC, diversity selection when diversity is used, coarse frequency offset estimation and timing synchronization. The long preamble part then provides for channel estimation and fine frequency offset estimation.

Each long symbol 107 and 109 consists of 64 samples. The guard interval 105 consists of a 32 bit cyclic extension of the 64 samples. Each of the long symbols consists of 53 subcarriers (including a zero value at dc), which are modulated by the elements of the following sequence:

{1, 1, −1, −1, 1, 1, −1, 1, −1, 1, 1, 1, 1, 1, 1, −1, −1, 1, 1, −1, 1, −1, 1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1, 1}

The subcarriers are denoted as subcarriers −26, −25, . . . , −1, 0, 1, . . . , 25, 26.

Thus, each long symbol is designed to exercise every subcarrier all at the same amplitude, with some subcarriers at 0° phase, while others at 180°. Having two long symbols provides for better channel estimates than by using only one long symbol.

The OFDM Receiver

Figure 2:
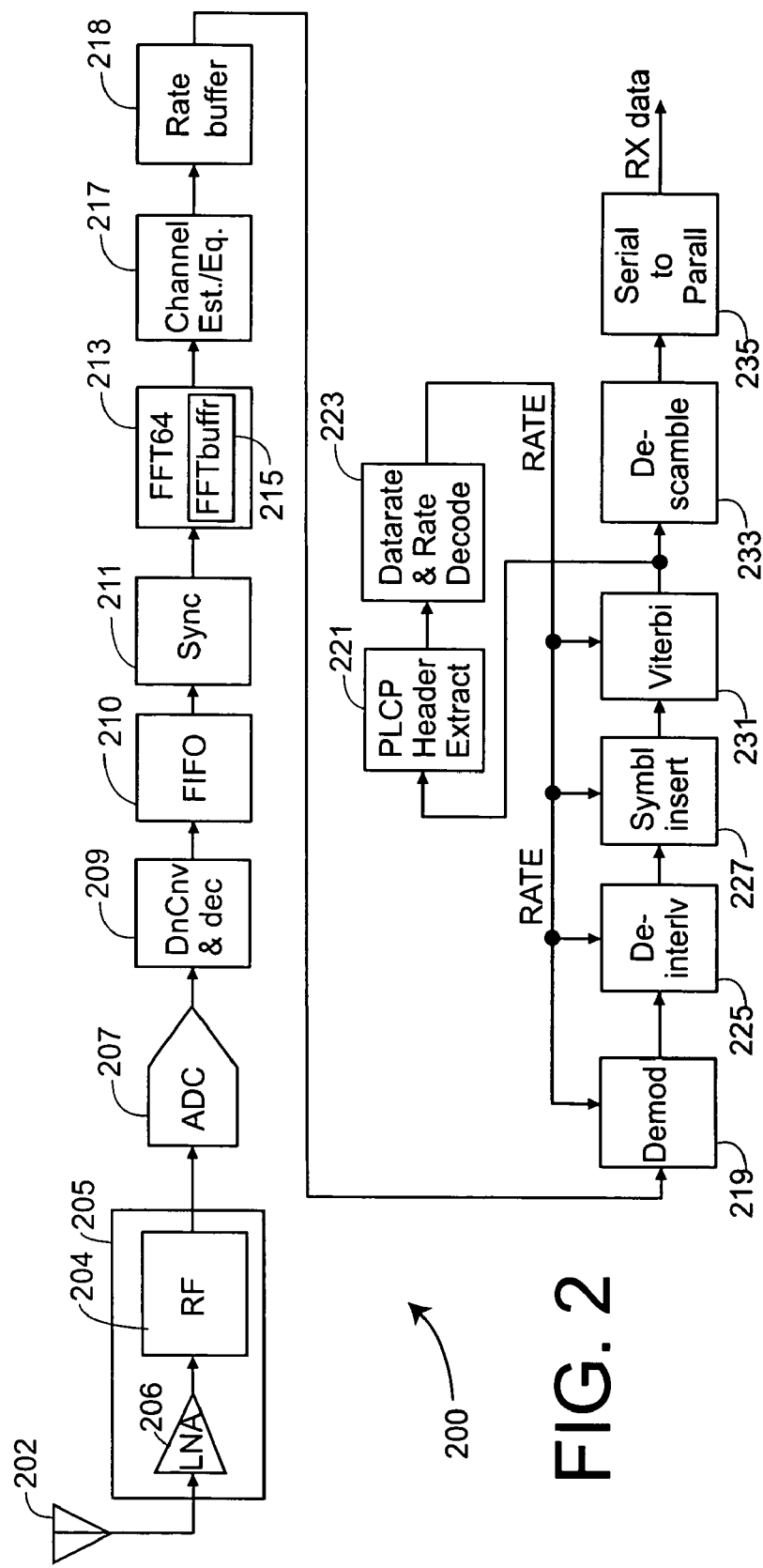
FIG. 2 shows a simplified block diagram of a receiver that can be an embodiment of the invention.

FIG. 2 shows a simplified block diagram of a typical OFDM receiver 200 that may be used for processing signals conforming to the IEEE 802.11 standard. While a receiver having the structure of FIG. 2 is in general prior-art, a receiver such as shown in FIG. 2 but that includes the inventive channel estimation method or apparatus described herein is not prior art.

A receive antenna receives RF signals. A low noise amplifier 206 combined with other RF components 204 forms a receiver 205 that generates analog signals. Some embodiments of receiver 205 may produce baseband signals that require no further downconversion, while others may produce IF signals that require further downconversion. The latter is assumed in this example. ADC 207 digitizes the signals. In one embodiment, block 209 further downconverts and decimates the signals to produce I and Q samples that enter a first in first out buffer 210 and a time synchronization unit 211. Synchronization is achieved by one or more methods such as estimating the short preamble's short symbol timing using a correlator and estimating the guard interval timing of the long preamble. The synchronization unit further includes frequency estimation and frequency correction using a rotator. The output of the rotator is presented to a 64-sample input buffer 215 of a 64-sample discrete Fourier transformer 213 (FFT64) for time-to-frequency conversion.

Figure 1B:
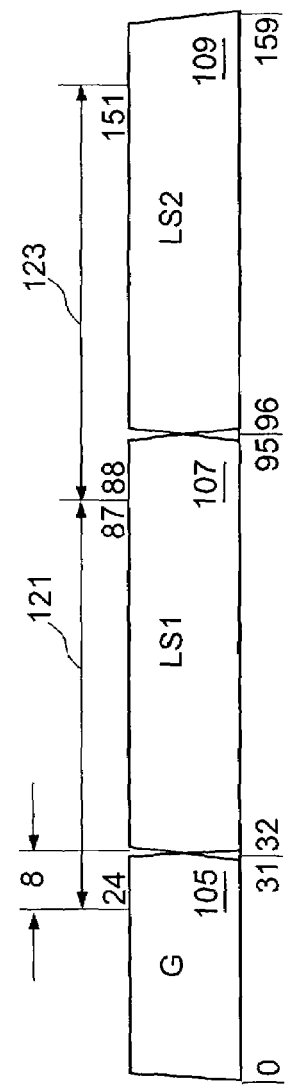
FIG. 1B shows the long signal part of the preamble of the OFDM packet of FIG. 1A.

Intersymbol interference (ISI) due to signal dispersion in the channel and multi-path reception corrupts early samples in the received samples. To provide good performance in the presence of these effects, the 64 samples selected for the FFT operation are typically taken in a region containing samples that may be assumed to be relatively uncorrupted by ISI. In the present example, the processing of frames is assumed to start 8 samples before the start of data, i.e., in the case of the signal frame 111 the subsequent data frames, 8 samples into the guard interval, and in the case of the long symbol part 119, three quarters of the way through the guard interval and again 8 samples before the start of the second long symbol. FIG. 1B shows the locations 121 and 123 of the samples taken from the first and second long symbol periods, respectively.

The Fourier transformer 213 transforms the complex baseband time-domain samples of the long symbol of the preamble plus the data-carrying OFDM symbols of the received packet into complex frequency domain samples by a DFT operation. In one embodiment, these are in bit-reversed frequency order.

The IQ frequency domain samples from Fourier transformer 213, in bit-reversed frequency order, are now input into a channel response estimator and equalization block 217. Block 217 includes a rectangular-to-polar (amplitude/phase) converter—a cordic in one embodiment—to convert the IQ samples into polar coordinate form before being processed by channel response estimation circuits in block 217. Block 217 further includes a channel equalization circuit that uses the channel estimator to equalize the signals. Also included in block 217 are a channel state information detection circuit, a pilot tone correction unit, and a second coordinate converter to convert the output from polar to rectangular coordinates. The output is thus a sequence of IQ frequency samples for demodulation by a demodulator 219.

A rate buffer block 218 is included before the samples are input into the demodulator. The rate buffer 218 is a second FIFO which buffers the received frequency samples from the end of the SIGNAL field for a number clock cycles equal to the latency (in clock cycles) through the parts of the receiver needed for processing the SIGNAL field, including demodulating and deciding. The rate buffer block 218 is included because the SIGNAL field, which is always transmitted as rate ½ binary phase shift keying (BPSK), determines the modulation type and coding rate of the remainder of the packet, shown as RATE in FIG. 2. This information is then used to set up the demodulator and Viterbi decoder parameters before the remainder of the packet is input into the demodulator chain. Hence, the remainder of the packet needs to be buffered until at least the RATE information has been successfully decoded.

The other elements of receiver 200 are the demodulator, de-interleaver, symbol inserter 227, Viterbi decoder 231, descrambler 233 and serial to parallel converter that demodulate and decode the received 64-samples frames.

Initially, these elements are set to process the SIGNAL field. Once the RATE information, including the modulation scheme are determined, these elements are set to demodulate the data frames of the payload. In this embodiment, the Viterbi decoder 231 is a ½-rate decoder, and the symbol inserter 227 is included to insert dummy signals to convert non-½ rate data into data suitable for the Viterbi decoder 231.

Channel Estimation

Channel estimation determines the transfer function, i.e., phase shift and amplitude response, for each of the subcarriers. Consider the output of the discrete Fourier transform operation, e.g., output of FFT64 unit 213 in FIG. 2. Because the time samples in the embodiment described herein are delayed by 8 samples, a (different) phase shift is introduced to each of the subcarriers. Thus, a channel response using such a time shifted long symbol produces a channel estimate that includes a linear phase-frequency response, i.e., a linear phase response factor that needs to be accounted for. The payload symbols, however, are also time-shifted by the same amount, i.e., are delayed by 8 samples. Thus, these also experience the same linear phase response factor as the long symbols used for channel estimation. Thus, equalization should be carried out in the frequency domain with a channel estimation that includes the linear phase response factor introduced by the sample shift. The 8-sample delay does not need to be separately accounted for.

In the prior art, the two responses are averaged, thus, in the frequency domain, the subcarrier response to the first long symbol for the n'th subcarrier is averaged with the subcarrier response to the second long symbol for the same n'th subcarrier for all values of n for which there is a subcarrier. This reduces the noise relative to using only one of the long symbol responses (in the frequency domain). Note that the equalization operation is essentially a "divide by the response" operation that is known to be sensitive to noise.

FIG. 3A shows a simplified block diagram of one version of a prior art channel estimator. The receiver electronics of the receiver up to the Fourier transformer 213 is shown as receive electronics block 340. A part of a signal received in receive electronics block 340 as a result of a data transmission is coupled, e.g., in the form of I, Q samples, to the Fourier transformer 213. The output of the Fourier transformer 213 is coupled to a buffer memory 307 via a switch 301 that has two outputs. The memory 307 stores the transform of the samples 121 of the response to the first long symbol, i.e., the subcarriers that correspond to a part of the received signal that corresponds to the first long symbol. The output of memory 307 is coupled to a first input of an averager 304. Thus, one output of the switch is coupled to the memory. A second output of the switch 301 is coupled to the second input of the averager 304. During the processing of the part of the received signal that corresponds to the first long period, i.e., of samples 121 of the first long symbol, the switch 301 connects the output of the Fourier transformer to the memory 307, and during the processing of a part of the received signal that corresponds to the first long period, e.g., the samples 123 of the second long period, the switch couples the output of Fourier transformer 213 to the second input of the averager 304. Thus the switch 301, memory 307, and averager 304 forms an averaging unit that forms an average of the subcarriers of the received signal parts that correspond to the first and second long symbols. The output of the averager is coupled to a factoring circuit 303 that in general divides the average by the known subcarrier in the two identical long symbols. In the case of a receiver conforming to the IEEE 802.11 standard, this simply rotates by 180° the phases of those subcarriers that had phase 180° at the transmitter. Not shown in FIG. 3A are control circuits, control lines, latches, and so forth.

FIG. 3B shows one parallel version of the prior art channel estimator shown in FIG. 3A. The output of the Fourier transformer 213 is coupled—in parallel—to a buffer memory 307 via a set 301 of switches 302. The memory 307 stores the transform of the samples 121 of the response to the first long symbol. Each output of the memory 307 is input into a first input of respective two-input averagers 305 of a set 304 of averagers. A second output of each switch is coupled to the second input of each respective one of the set of averagers 304. During the processing of the samples 121 of the first long symbol, each switch 302 in switch set 301 connects each output of the Fourier transformer to the memory 307, while during the processing of the samples 123 of the second long period, each switch in switch set 301 couples each output of Fourier transformer 213 to the second input of the respective one of the averagers 305. The outputs of the averagers are coupled to a circuit 303 that in general divides the averages by the respective known subcarrier in the long symbol. Not shown are control circuits, control lines, latches, and so forth.

Note that the prior-art system of FIG. 3A may be modified so that the averaging unit is located after the factoring unit, i.e., at location AA, so that the averaging is of rough channel estimates, each formed using one of the long symbols, rather than of the subcarriers of the two long symbols. Other variations also are possible.

The prior art systems of FIGS. 3A and 3B each form averages of the channel estimates from each of the long symbols subcarrier-by-subcarrier. The prior art does not exploit the fact that for moderate delay spreads the channel transfer functions of nearby subcarriers, e.g., of adjacent subcarriers are correlated. We have found that typically in a system that conforms to the IEEE 802.11 standard, the coherence bandwidth of the channel is larger than the frequency difference between subcarriers, i.e., there is some correlation between the channel transfer functions of adjacent subcarriers. We have found this to be true for delay spreads as high as 100 ns and that there is significant correlation between a subcarrier and a plurality of its adjacent neighbors for moderate subcarriers for moderate delay spreads, e.g., of 25–50 ns RMS using an exponential decay model.

FIGS. 4A to 4D show simplified block diagrams of several embodiments of channel estimators that each takes advantage of any correlation that exists between the channel of one subcarrier and the channels of one or more of its immediate neighbors.

Figure 4A:
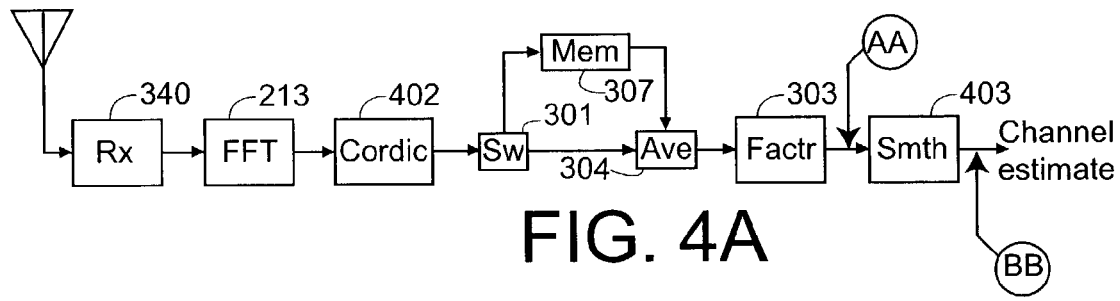
FIGS. 4A–4D show simplified block diagrams of different embodiments of a channel estimator that uses known signals of transmitted data to determine the channels for the subcarriers in a multicarrier radio receiver.

Consider first the embodiment of FIG. 4A. The Fourier transformer 213 is to determine the set of the subcarriers that are received as a result of the long symbol transmission. The Fourier transformer determines these subcarriers from a part of the received signal that corresponds to the long symbol. The output of the Fourier transformer 213 is coupled to a rectangular-to-polar transformer 405, e.g., a cordic, to convert the subcarriers from I, Q to amplitude and phase form. The cordic output is coupled to an averaging block that includes a switch 301, a memory 307, and an averager 304. As a result of receiving a signal that was transmitted and that includes a first and a second long symbol, the switch 301 couples the Fourier transformer output to the memory 307 during reception of the part of the received signal that corresponds to the first long symbol, and to the averager during reception of the part of the received signal that corresponds to the second long symbol. Thus, after both symbols have been received, the output of the averager is the set of the averages of the subcarriers that correspond to each of the first and second long symbols. In the embodiment shown in FIG. 4A, the averages are in polar coordinates, i.e., amplitude-phase form. Factoring unit 303 divides each average received subcarrier by the respective known subcarrier in the long symbols. Note that up to the output of the factoring unit 303, the system of FIG. 4A operates substantially the same as that of FIG. 3A. The outputs of the circuit 303 are averaged rough estimates of the channel of each of the subcarriers based on the two received long symbols. The outputs of the circuit 303 are coupled to a smoothing filter 309 that determines an improved channel estimate for each subcarrier by smoothing the averaged rough estimate of the channel for that subcarrier and the averaged rough estimates of the channels of its immediate one or more immediate neighbors. Thus, for example, the estimate of the channel for subcarrier 8 is obtained by applying the smoothing filter to the averaged rough estimates of the channels for subcarrier 6, 7, 8, 9, and 10 for the case of a five point smoothing filter.

In general, the estimate of a particular subcarrier's channel is improved by incorporating information about channels from the particular subcarrier's immediate neighbors. Different smoothing filters use a different number of immediate neighbors, and such different filters are discussed below.

Note that while it is not necessary to process the DFT components that do not correspond to the 52 non-zero subcarriers, one set of embodiments includes processing such subcarriers, and ignoring the results of the subcarriers other than the non-zero subcarriers. Other embodiments include only processing the DFT components corresponding to the 52 non-zero subcarriers denoted subcarriers −26, qj−25, . . . , −1, 1, 2, . . . , 25, 26.

Figure 4B:
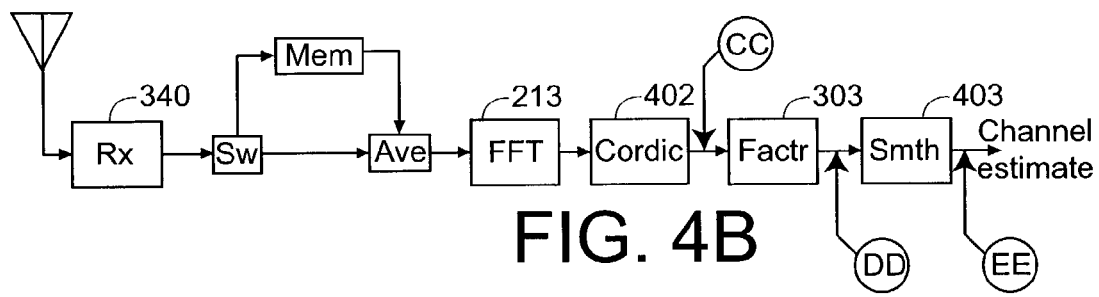
Figure 4C:
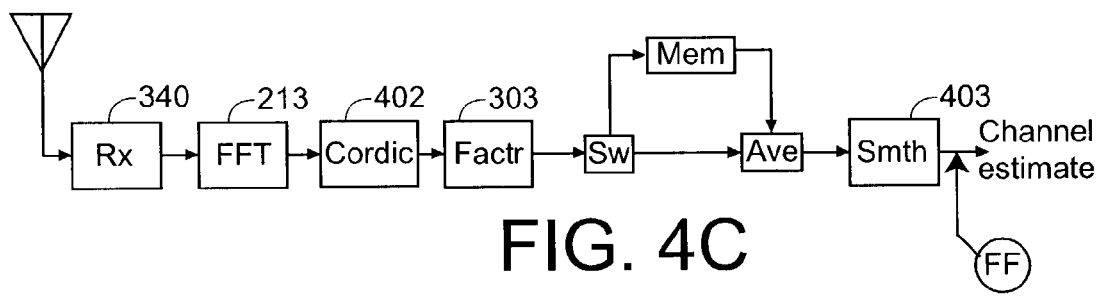

Different embodiments may place the averaging unit that includes the switch, memory, and averager at different points in the processing chain. Thus, one embodiment may have the averaging unit after the factoring unit and before the smoothing filter at location AA (FIG. 4A) such that the memory stores the rough channel estimate determined from the first long symbol, and such that the averaging is of two sets of rough channel estimates, each set determined from each respective long symbol. This configuration may be used, for example, when the first and second known long symbols are not identical. FIG. 4C shows one such embodiment.

Figure 4D:
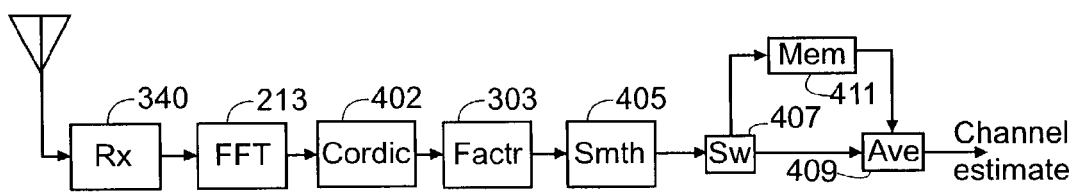

Another embodiment may have the averaging unit after the smoothing filter at location BB (FIG. 4A) or FF (FIG. 4C) such that the memory stores the smoothed rough channel estimate determined from the first long symbol, and such that the averaging is of two sets of smoothed rough channel estimates each set determined from each respective long symbol. This configuration also may be used, for example, when the first and second known long symbols are not identical. FIG. 4D shows one such embodiment.

Another embodiment has the averaging unit before the Fourier transformer 213. Such an embodiment is shown in FIG. 4B. The memory stores the part of the received signal corresponding to the first long symbol, and the averager forms the average of the two parts of the received signal that correspond to the first and second symbol. This configuration can be used for example, when the first and second known long symbols are identical. Also shown in FIG. 4B are some alternate locations for the averaging unit. Locations CC, DD, and EE correspond to the embodiments of FIG. 4A, FIG. 4C, and FIG. 4D, respectively.

Figure 4E:
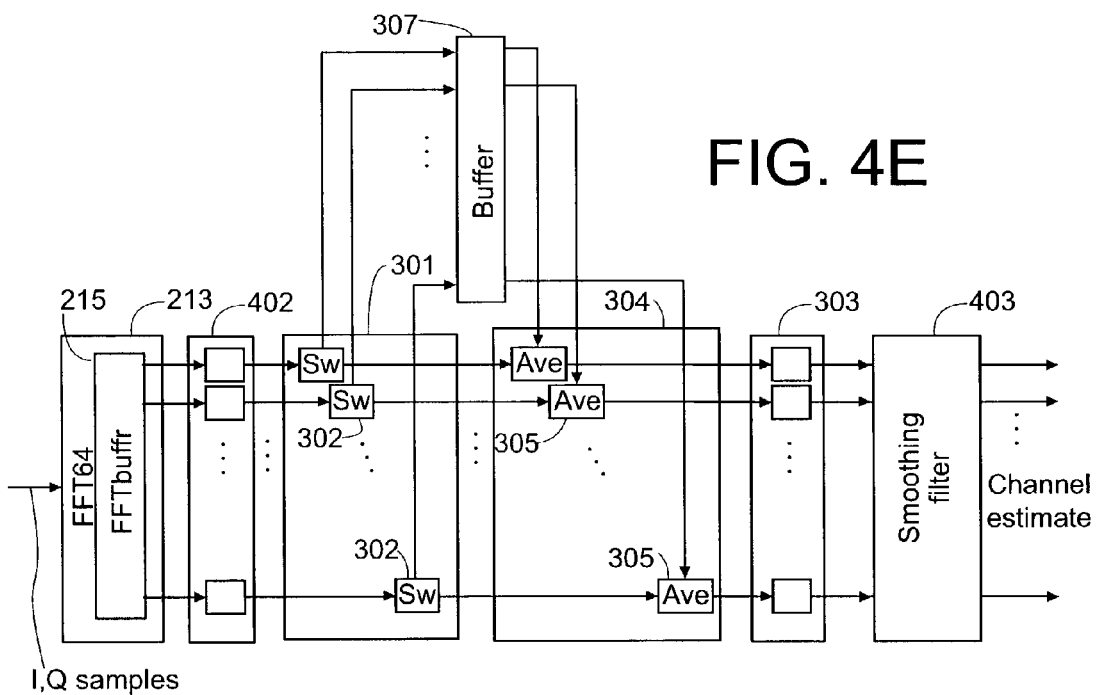
FIGS. 4E and 4F show simplified block diagrams of two parallel embodiments of channel estimators.

FIG. 4E shows one parallel embodiment of the channel estimator shown in FIG. 4A. The output of the Fourier transformer 213 is coupled—in parallel—to a buffer memory 307 via a set 301 of switches 302. The memory 307 stores the transform of the samples 121 of the response to the first long symbol. Each output of the memory 307 input into a first input of respective two-input averagers 305 of a set 304 of averagers. A second output of each switch is coupled to the second input of each respective one of the set of averagers 304. During the processing of the samples 121 of the first long symbol, each switch 302 in switch set 301 connects each output of the Fourier transformer to the memory 307, while during the processing of the samples 123 of the second long period, each switch in switch set 301 couples each output of Fourier transformer 213 to the second input of the respective one of the averagers 305. The outputs of the averagers are coupled to a circuit 303 that in general divides the averages by the respective known subcarrier in the long symbol. Thus, the set of outputs of the factoring unit 303 is a set of averaged rough channel estimates. The outputs of the factoring unit 303 are coupled to a smoothing filter 403 that generates an improved (smoothed) average rough estimate of the channel for each of the subcarriers. Not shown are control circuits, control lines, latches, and so forth. Note further that in practice, a channel estimator such as the estimator of FIG. 4E need only process the DFT components corresponding to the 52 non-zero subcarriers denoted subcarriers −26, −25, . . . , −1, 1, 2, . . . , 25, 26.

Figure 4F:
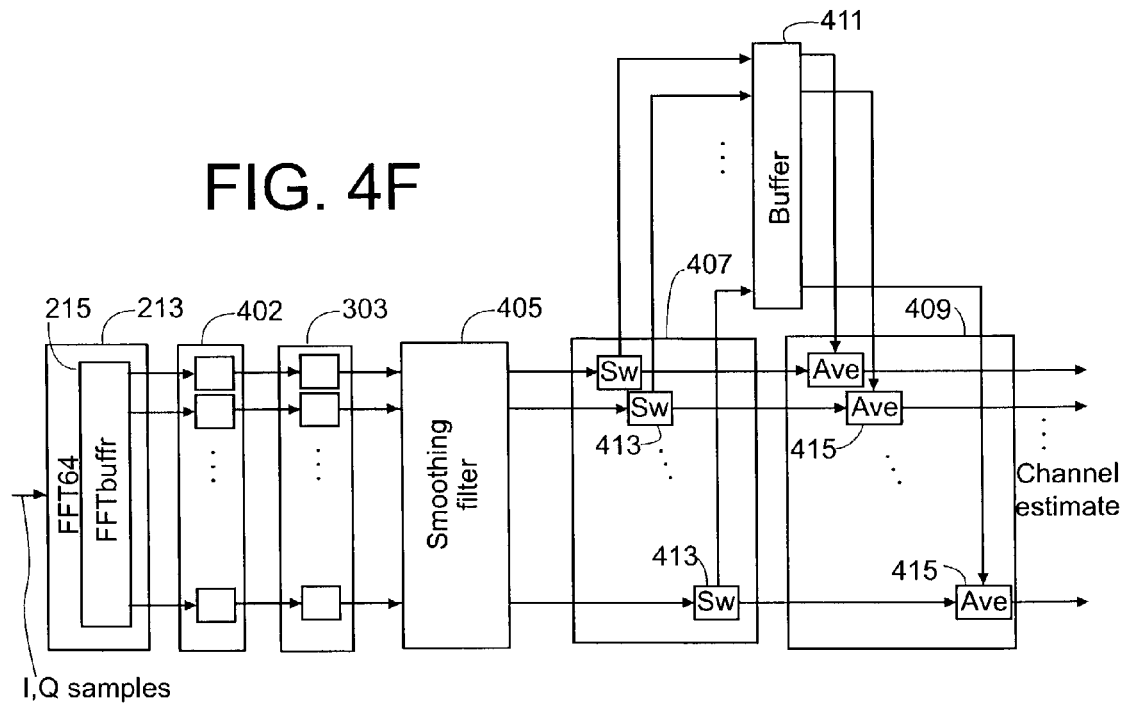

FIG. 4F shows one parallel embodiment of the channel estimator shown in FIG. 4D. The output of the Fourier transformer 213 is coupled—in parallel—to a circuit 303 that in general divides the averages by the respective known subcarrier in the long symbol. Thus, the set of outputs of the factoring unit 303 is a first set of rough channel estimates when the Fourier transformer 213 transforms the part of the received signal that corresponds to the first long symbol, and a second set of rough channel estimates when the Fourier transformer 213 transforms the part of the received signal that corresponds to the second long symbol. The smoothing filter 405 generates improved sets of rough estimates of the channel for each of the subcarriers. The outputs of the smoothing filter 405 are coupled to a buffer memory 411 via a set 407 of switches that makes the connection to the memory when the output of the Fourier transformer is the transform of the part of the received signal that corresponds to the second first symbol. Thus, the memory 411 stores the smoothed rough estimate of the channel based on the response to the first long symbol. Each output of the memory 411 is connected to a first input of a respective two-input averager 415 of a set 409 of averagers. A second output of each switch 413 of switches 407 is coupled to the second input of each respective one of the set 409 of averagers 415. During the processing of the samples 121 of the second long symbol, each switch 413 connects each output of the smoothing filter 405 to the second input of the respective one of the averagers 415. The outputs of the set 409 of averagers 415 thus generate the average of the two sets of smoothed rough channel estimates. Not shown are control circuits, control lines, latches, and so forth. Note further that in practice, a channel estimator such as the prior art estimator of FIG. 4F need only process the DFT components corresponding to the 52 non-zero subcarriers denoted subcarriers −26, −25, . . . , −1, 1, 2, . . . , 25, 26.

Note that the above embodiments only store a function of the first known signal part—the first long symbol. Another set of embodiments provide for adaptive smoothing coefficient selection wherein the right smoothing coefficients are only known after both long symbols. For such embodiments, an extra storage element to store a function of the second long symbol is needed. See below for more discussion.

Figure 4G:
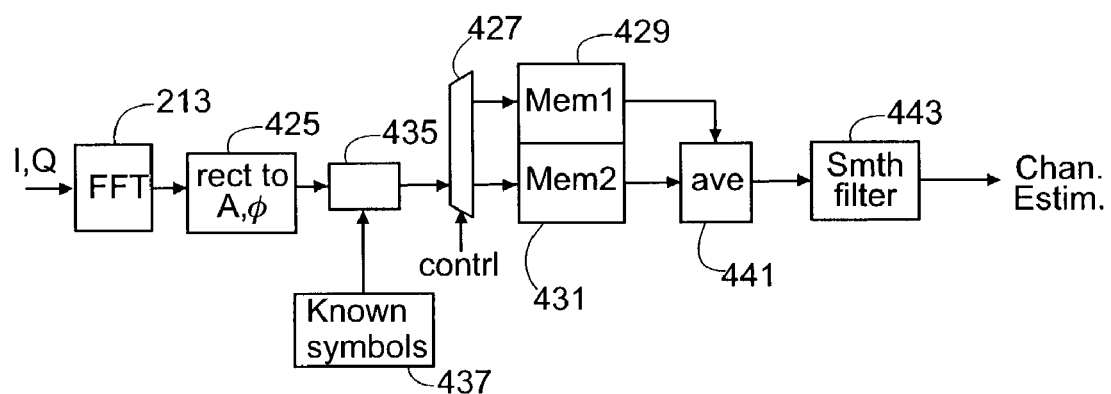
FIG. 4G shows a simplified block diagram of a serial embodiment of a channel estimator.

FIGS. 4E and 4F describe parallel implementation. One serial embodiment is shown in FIG. 4G. The serial embodiment shown corresponds to the simplified block diagram of FIG. 4C, except that the memory contains an additional memory element to store a function of the samples of the second long period. The serial channel estimator embodiment includes only a single switch element 427 and a single averaging element 441. The output of the Fourier transformer is read serially, sample by sample. The circuit 425 converts each subcarrier into amplitude/phase and in one embodiment, includes a cordic. The circuit 435 factors out the known amplitude and phase for each subcarrier of the first and the second known symbols, depending on whether the samples are of the first or second long period are being processed. During the processing of the samples of the first long period, the switch 427 connects the output of factoring unit 425 such that a first set of rough channel estimates of the subcarrier is input into a first memory 429, subcarrier-bysubcarrier, while during processing of the samples of the second long period, the switch 427 connects the output of factoring unit 425 such that a second set of rough channel estimates of the subcarrier is input into a second memory 431, subcarrier-by-subcarrier. In the general case, the first and second memories store a function of the received samples corresponding to the first and second known symbols, respectively.

In some embodiments, the subcarriers resulting from the DFT operation are other than "natural" order, i.e., the adjacent subcarriers arrive in order very different to "adjacent"/"natural" order. Carrying out the channel estimation method serially rather than in parallel needs to take such sample ordering into account. The embodiment of FIG. 4G includes the second memory and can handle the samples being read-out of the Fourier transform in any order. The memories include read/write logic (not shown) for writing sequentially and for reading each memory in an order that causes the output to be natural, i.e., adjacent subcarrier-by-adjacent subcarrier. The reading of the memories occurs after both memories have been filled with all the required samples. The memories are output to a multi-input averager 441 to sequentially generate average rough channel estimates, subcarrier-by-subcarrier. The average rough channel estimates are input to a smoothing filter 443. Not shown in FIG. 4G are the control circuits, e.g., for sequencing the samples through the estimator.

Alternate embodiment suitable for the case of the Fourier transform output samples arriving in natural order may exclude the second memory. A serial embodiment of the embodiment shown in FIG. 4B similarly may leave out the second memory. However, a re-ordering may still be needed between the Fourier transformer and the smoother in the case that the Fourier transformer produces data in non-natural order.

Note that further variations are possible. For example, some of the elements may be included in each branch of the switch prior to the averager. For example, referring to FIG. 4A, in an alternate embodiment, two factoring units such as unit 303 may be placed immediately before each input of averager 304 instead of the single unit 303 after the output of averager 304. Including a pair of elements prior to the averager does not lead to optimal configurations, since such elements are unnecessarily duplicated. However, such configurations are still within the scope of the invention.

Thus, referring to FIGS. 4A–G, apparatus embodiments of the invention are for inclusion in a multicarrier wireless receiver that includes receive electronics (340) to receive a multicarrier signal as a result of a wireless transmission of data that includes a plurality of known signals (FIG. 1), and a Fourier transformer (213) transforming the parts of the received signal to their respective sets of subcarriers. One embodiment of the apparatus includes a factoring unit (303) coupled to the Fourier transformer of the receiver to factor out the set of subcarriers corresponding to the known transmitted signal from the set of subcarriers determined by transforming the parts of the received signal that correspond to the known signals, and a smoothing filter (403 or 405) coupled to the factoring unit, such that the smoothing filter outputs a set of smoothed channel estimates, the smoothed channel estimate for a particular subcarrier including a contribution from channel estimates of the particular subcarrier's one or more immediate neighbors to take advantage of correlation that may exist between the particular subcarrier's channel and the channels of that subcarrier's one or more immediate neighbors. The apparatus further includes a memory unit (e.g., 307 in FIG. 4A) for storing a function of the part of the received multicarrier signal corresponding to the known signal, and an averaging unit (e.g., 304 in FIG. 4A) having a first and second input, the first input coupled to the memory unit and the second input coupled to the receive electronics, such that each smoothed channel estimate is a smoothed version of the average of the sets of channel estimates respectively determined using the part of the received signal that corresponds to the known signal and the part of the received signal that corresponds to the additional known signal. In a serial embodiment, the memory unit is further to store the function of the parts of the received multicarrier signal corresponding to an additional known signal, so that the second input of the averager is coupled to the receive electronics via the memory. This provides for inputting data into the memory in a first order and reading the data out of the memory in the natural order.

The Smoothing Filter

Different embodiments of the invention may use different smoothing filters. A first set of embodiments uses a moving average filter as a smoothing filter. A second set of embodiments uses a weighted moving average filter. A moving average filter may be considered a weighted moving average filter with equal weights, thus the first set of embodiments uses different weighted moving average filters.

Denote by $(A_n, \Phi_n)$ and $(A_n', \Phi_n')$ the rough (amplitude, phase) channel estimates for the n'th subcarrier based on the first and second long symbol, respectively, where n denotes the subcarrier. Denote by $(\hat{A}_n, \hat{\Phi}_n)$ and $(\hat{A}_n', \hat{\Phi}_n')$ respectively the smoothed rough (amplitude, phase) versions of $(A_n, \Phi_n)$ and $(A_n', \Phi_n')$ of subcarrier n. Denote by $W_n$ the discrete impulse response of the filter. For the non-zero subcarriers, i.e., for n=−26, −25, . . . , −1, 1, 2, . . . , 25, 26, in general $$\hat{A}_n = \sum_{k=-M}^{M} W_k A_{n-k}, \hat{\Phi}_n = \sum_{k=-M}^{M} W_k \Phi_{n-k}, \text{ and}$$

$$\hat{A}_n' = \sum_{k=-M}^{M} W_k A_{n-k}', \hat{\Phi}_n' = \sum_{k=-M}^{M} W_k \Phi_{n-k}',$$

where the filter's impulse response $W_n$ is 2M+1 long and symmetrical about n=0.

The impulse response values are sometimes called the smoothing coefficients. Different embodiments use different sets of smoothing coefficients. Table 1 below lists some possible sets of smoothing coefficients:

TABLE 1

| Filter | Smoothing Coefficients |
| --- | --- |
| filter (a) | 0 1 0. |
| filter (b) | 1/3 1/3 1/3. |
| filter (c) | 1/4 1/2 1/4. |
| filter (d) | 1/8 3/4 1/8. |
| filter (e) | 1/5 1/5 1/5 1/5 1/5. |
| filter (f) | 1/8 1/4 1/4 1/4 1/8. |
| filter (g) | 1/16 1/8 1/8 1/8 1/8 1/8 1/8 1/8 1/16. |
| filter (h) | 1/16 1/8 1/8 1/8 1/8 1/8 1/8 1/8 1/16. |

Filter (a) is a "null" filter that corresponds to not smoothing. For computational efficiency, the filters are implemented to minimize the number of divide operations. Thus, in one embodiment, filter (b) of Table 1 is implemented by adding the previous, current, and next subcarrier, and dividing the total by 3. Filter (h) is as $$\hat{A}_n = (A_{n-4} + 2A_{n-3} + 2A_{n-1} + 2A_{-1} + 2A_n + 2A_{n+1} + 2A_{n+2} + 2A_{n+3} + A_{n+4})/16,$$

and so forth. One implementation of the filters uses a parallel-in, parallel-out register, with the parallel outputs of the shift weighted and input to an adder. The output of the adder is fed to a divider circuit to produce the smoothed output.

Note that in another embodiment, rather than smoothing being in the amplitude/phase domain, the smoothing operation is carried out in the rectangular (I, Q) coordinate domain. Carrying out smoothing in the I, Q domain requires additionally dealing with the phase slope due to the delay of the input samples. How to include such phase slope correction to modify the amplitude/phase smoothing embodiments described herein to carry out smoothing in the I, Q domain would be clear to one in the art.

The Edge Subcarriers

The edge subcarriers are those subcarriers close to a zero subcarrier. Such subcarriers need to be smoothed differently to the middle subcarriers because otherwise one or more zero-value subcarriers would be included in the smoothing operation, leading to errors. For example, if the amplitude of the rough channel estimates of subcarriers −26, −25, and −24 were each 1, then applying smoothing filter (e) of Table 1 above to the amplitude would lead to smoothed rough channel amplitudes of ⅗, ⅘, and 1 for subcarriers −26, −25 and −24, respectively. The phase would also be similarly erroneous.

In one embodiment, a number of edge subcarriers—the number depending on the width of the smoothing filter impulse response, are processed differently than the non-edge subcarriers. In the embodiments that use a smoothing filter with an odd number of smoothing coefficients, that number being 2M+1 where M is an integer, the first M smoothed subcarrier channels from each edge are processed differently. In one embodiment, no smoothing is performed for the M closest to edge subcarrier channels. As an example consider filter (e) of Table 1 above for which M=2. In this example, the estimates of channel of non-zero subcarriers −26, −25, −2, −1, 1, 2, 25, and 26 are not obtained with smoothing, i.e., the smoother is bypassed for these subcarriers. In a second embodiment, the first edge subcarrier is not smoothed, the next is smoothed with a 3-coefficient filter (if M≧1), the next with a 5-coefficient filter (if M≧2), and so forth, until the 2M+1 coefficient filter uses only non-zero subcarriers. As an example consider filter (h) of Table 1 above for which M=3. The channel estimates of the edge subcarriers −26, −1, 1, and 26 are obtained by bypassing the smoothing filter, the channel estimates for subcarriers −25, −2, 2, and 25 are obtained using a 3-point filter such as filter (c), the channel estimates for subcarriers −24, −3, 3, and 24 are obtained using a 5-point filter such as filter (f) of Table 1, and the channel estimates of the other non-zero subcarriers are obtained by normal smoothing, i.e., using the smoothing filter (h) of Table 1.

Other alternate embodiments for dealing with the edge subcarriers include applying a non-symmetric smoothing filter for the edge carriers. For example, suppose filter (h) is used for the non-edge subcarriers, then a filter that averages the channels of −26, −25, and −24 is used for the channel of subcarrier −26, and a filter that averages the channels of −26, −25, −24, and −23 is used to determine the smoothed rough channel for subcarrier −25. Note that while this would produce the correct amplitude response, the smoothed phase response for the edge subcarriers would include a phase bias that needs to be corrected. Recall that the DFT is of the samples starting from within the guard interval rather than the start of data. This introduces a different phase factor to the rough channel estimates of a subcarrier and its neighboring subcarriers. These differences cancel when using a symmetric smoothing filter. Using a non-symmetric phase bias introduces a phase bias. Thus, using a non-symmetric smoothing filter requires additional correction of those channel estimates that are obtained by non-symmetric smoothing. How to so correct those channel estimates would be clear to those in the art. For example, suppose the three subcarriers −26, −25, and −24 have phase angles channel responses $\phi_{-26}$, $\phi_{-25}+\theta$, and $\phi_{-25}+2\theta$, respectively, where $\theta$ is some known phase angle that occurs because of the offset in starting sample. One embodiment first subtracts phase $\theta$ and $2\theta$ from the rough phase response estimate of subcarriers −25 and −24, respectively, before using phase responses for subcarriers −26, −25, and −24 to determine the smoothed rough phase response for subcarrier −26. Similarly, to determine the smoothed rough phase response for subcarrier −25, the phase $\theta$ is added to the rough phase of −26, and the phases $\theta$ and $2\theta$ are subtracted from the phase responses for subcarriers −24 and −23, respectively. Thus, while there is an advantage in smoothing the rough channel estimates of the edge subcarriers using non-symmetric smoothing, i.e., using more neighboring channel estimates, there also is a penalty in additional computational complexity to correct the phase.

The various elements of the embodiments of FIGS. 4A–4G may be implemented by dedicated hardware. In other embodiments, one or more finite state machines are used to implement one or more of the elements and to control the operation of the estimator. In other embodiments, one or more programmable processors are used to implement one or more of the elements, as well as the control of the functioning. Finite state machines and programmable processors may also be combined. U.S. patent application Ser. No. 10/096,010 to inventor Ryan filed Mar. 11, 2002 and titled METHOD AND APPARATUS TO REDUCE PROCESSING LATENCY IN A WIRELESS DATA NETWORK RECEIVER describes a data modem that includes finite state machines and a general purpose processor. One or more embodiments of the invention may be incorporated into the modem. The modem can be combined with an analog radio receiver. U.S. patent application Ser. No. 10/096,010 is incorporated herein by reference.

Method Embodiments:

The forming of the channel estimate may be described as a method. FIG. 6 shows the pseudocode of a method 500 of obtaining a channel estimate by receiving a signal as a result of a transmission of data that includes a set of one or more known signals, e.g., one or more known long symbols. The method 500 includes accepting one or more sets of received signal samples corresponding to each of the one or more known signals, determining the set of subcarriers corresponding to the known signal or signals, for example by converting the received signal samples to the frequency domain, e.g., using a DFT, determining a rough channel response for each subcarrier by factoring out the known signal or signals from the determined subcarriers, and filtering the rough channel estimates using a smoothing filter to form smoothed rough channel estimates. The method further includes determining the channel estimates by averaging. These channel estimates for each subcarrier are then used to equalize received data in the payload.

In some embodiments, the averaging is prior to the smoothing such that the smoothing is of averaged rough channel estimates. In one such embodiment in which each of the known signals—e.g., each of the long symbols—is the same, the averaging is of the sets of received signal samples corresponding to each known signal to form an average set of received signal samples. In another such embodiment in which each of the known signals is the same, the averaging is of the sets of subcarriers each obtained from a set of received signal samples corresponding to each known signal. The averaging forms a set of averaged subcarriers from each of the subcarriers of the known signal. Each of the averaged subcarriers has factored out the corresponding subcarrier of the known signal to form averaged rough channel estimates. In another such embodiment in which each of the known signals need not be the same, the averaging is of the rough channel estimates after factoring out the subcarriers of each respective known signal.

In other embodiments, the averaging is after the smoothing of the rough channel estimates, each set of rough channel estimates being produced from the respective set of received signal samples corresponding to one of the known signals. In one embodiment, the averaging is obtained by, for each known signal but the last, accumulating the smoothed channel estimates in a buffer memory, and using the accumulated memorized channel estimates with those for the last known signal to obtain an average of the smoothed rough channel estimates for the known signals.

In some embodiments, the subcarriers resulting from the DFT operation are in other than natural order. Carrying out the channel estimation method serially rather than in parallel needs to take into account that the adjacent subcarriers arrive in order very different to "adjacent"/"natural" order. One serial embodiments includes storing all of the received signal samples corresponding to the first known signal prior to smoothing the first set of rough channel estimates, then storing all of the received signal samples corresponding to the second known signal prior to smoothing the second set of rough channel estimates.

Adaptive Smoothing

An improved embodiment includes determining the smoothing filter adaptively. In one receiver embodiment for receiving signals with at least two known OFDM signal parts, e.g., a first known signal part and a second known signal part, the smoothing filter is selected from a set of candidate smoothing filters according to how well channel estimates produced by applying each candidate filter to rough channel estimates determined from the received signals corresponding to the first known signal part predict the data received corresponding to the second known signal part.

The method includes receiving a signal as a result of a transmission of data that includes two known signals, e.g., two known long symbols, and accepting a set of received signal samples corresponding to the first known signal. The method further includes determining the set of subcarriers corresponding to the first known signal, for example by converting the received signal samples to the frequency domain, e.g., using a DFT, and determining a first rough channel estimate for each subcarrier by factoring out the respective subcarriers of the first known signal from the determined subcarriers. In one embodiment, the set of first rough channel estimates is stored. The stored first rough channel estimates are smoothed by a set of candidate smoothing filters to provide a set of candidate smoothed first rough channel estimates, one such set for each candidate smoothing filter. The set of candidate filters in one embodiment includes one "null" filter that performs no smoothing, e.g., a filter such as filter (a) of Table 1 above. For example, if the channel is highly dispersive, there may indeed be no correlation between the channels of adjacent subcarriers so that no smoothing is better than smoothing.

One embodiment further includes accepting a second set of received signal samples corresponding to the second known signal and determining the set of subcarriers corresponding to the second known signal, for example by converting the received signal samples to the frequency domain, e.g., using a DFT, and determining a second rough channel estimate for each subcarrier by factoring out the respective subcarriers of the first known signal from the determined subcarriers. In one embodiment, the set of second rough channel estimates also is stored.

Each set of candidate smoothed first rough channel estimates is compared to the set of second rough channel estimates. The comparison may be using a metric. One metric is the weighted sum of the amplitude and phase deviations. Another metric is the weighted sum of the squared magnitudes of the differences. Other metrics also may be used. In one embodiment, a set of metrics is accumulated, one for each of the candidate smoothing filters. The candidate smoothing filter that provides a set of smoothed first rough channel estimates "closest" to the second rough cannel estimates, i.e., having the lowest metric, is then chosen to be the selected smoothing filter. In one embodiment, the choosing is by comparing the accumulated metrics. In one embodiment, the stored second rough channel estimates are averaged with the stored set of first channel estimates and the average rough channel estimates smoothed using the selected smoothing filter to provide a set of smoothed channel estimates. In another embodiment, the stored second rough channel estimates are smoothed with the selected filter prior to averaging, and then the set of smoothed first rough channel estimates and the set of smoothed second rough estimates are averaged for each subcarrier to provide the channel estimates for each subcarrier. These channel estimates for each subcarrier are then used to equalize received data in the payload.

Note that for highly frequency-selective fading channels, it may be that the "no smoothing" candidate filter that gives zero weight to neighboring subcarriers provides better performance than any smoothing.

In another embodiment, each subcarrier of the known signal is multiplied with the corresponding smoothed channel estimate and compared with the subcarriers determined from the second set of samples. Thus, the candidate smoothing filters (including no smoothing) are compared to see which predicts the part of the received signal corresponding to the second known signal. In yet another alternate embodiment, each of the smoothed, averaged channel estimates is computed using each of the candidate smoothing filters, and the preferred smoothing filer selected after the second long symbol is completed.

According to yet another embodiment, a measure of the quality of reception of subsequent parts of the packet, e.g., the SIGNAL field or the data symbols are used to select the preferred set of channel estimates from the candidate sets. One embodiment uses another error measure.

Figure 5A:
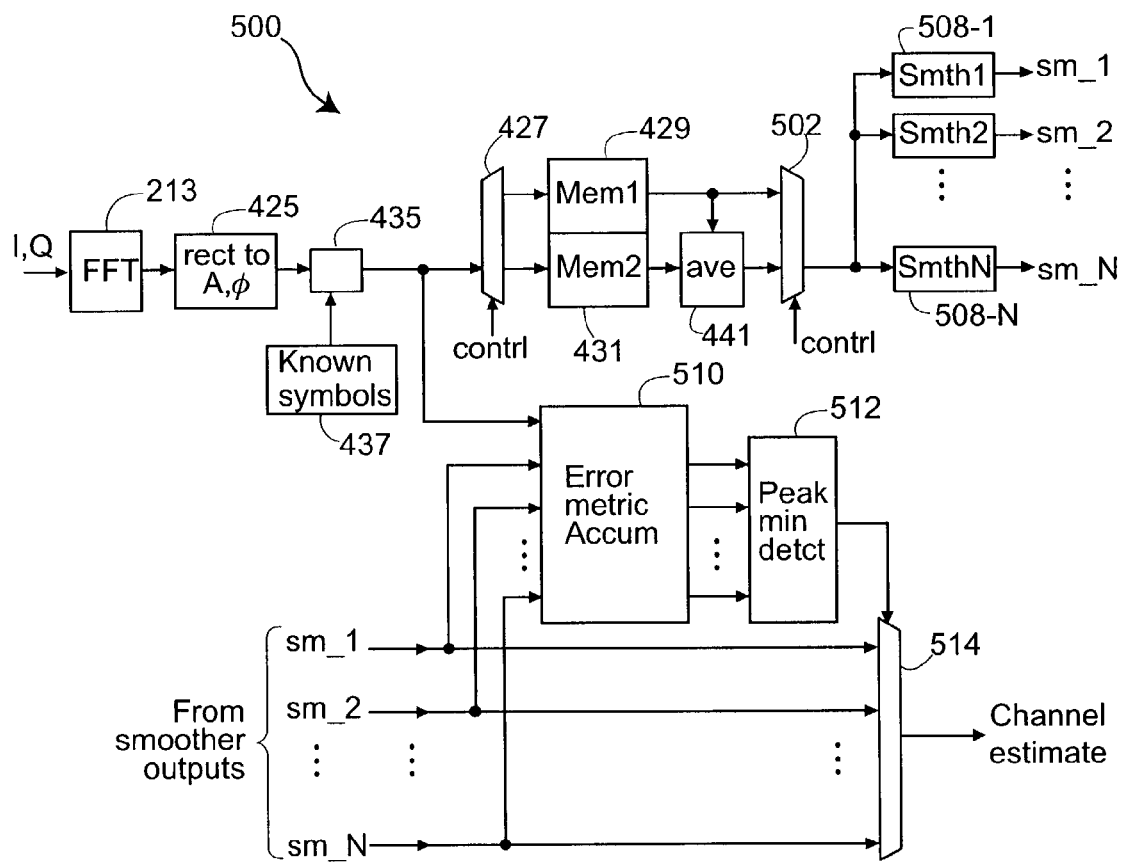
FIG. 5A shows a simplified block diagram of one serial embodiment of an adaptive channel estimator.

FIG. 5A shows one serial embodiment of an adaptive channel estimator 500. The estimator 500 accepts a sequence of samples from a Fourier transformer 213 via a rectangular to polar converter 425, e.g., a cordic. As discussed above, the order of the arrival of samples into the channel estimator is not natural, i.e., adjacent subcarriers are not adjacent. The output of the cordic is coupled to a factoring unit 435. The output of the factoring unit is fed to either a first memory 429 or a second memory 431 via a switch 427. The I, Q samples that are input to the Fourier transformer are of a signal that includes a first and a second known signal.

During arrival of subcarriers from the Fourier transformer 213 that correspond to the first known signal, the factoring unit 437 factors out the corresponding subcarriers of the known first signal from a store of known symbol data 437, and the switch is such that the resulting rough channel estimates of a first set of rough channel estimates are fed into the first memory 429. The memory is input sequentially.

During arrival of subcarriers from the Fourier transformer 213 that correspond to the second known signal, the factoring unit 437 factors out the corresponding subcarriers of the known second signal from store 437, and the switch is such that the resulting rough channel estimates of a second set of rough channel estimates are fed into the second memory 439. At the same time, the first memory 429 is read out in an order described further below. The output of the memory is connected to a first input terminal of a two input selector 516. The selector selects the output of the first memory, and the output of selector 502 is coupled to each filter input of a set of N candidate smoothing filters 508-1, . . . , 508-N to produce N sets of candidate smoothed rough channel estimates. The N candidate rough channel estimates are input to an error metric accumulator 510 as are the rough channel estimates of the second set from the converter 425. The order of the readout of the first memory is such that the rough channel estimate outputs of the candidate filters enter the error metric accumulator 510 in the same non-natural order as the rough channel estimates of the second set arrive from the rectangular to polar converter 425. Thus, while the second set of rough channel estimates are stored in the second memory and fed into the error metric accumulator 510, the candidate sets of smoothed rough channel estimates are generated and also fed to error metric accumulator 510. The error metric accumulator 510 accumulates the error metric for each candidate smoothing filter. After the second memory 431 is full, the error metric accumulation is complete. The error metrics are input to a peak-min detector that generates a control signal to a selector 514 to select one of the N outputs of the N smoothing filters.

The output of the second memory is connected to one input of a two input averager 441. The output of the first memory is connected to the second input of the averager 441. After the second set of rough channel estimates is stored, i.e., all the estimates determined using the part of the received signal samples corresponding to the second known signal are stored in the second memory, the first and second memories are both read out sequentially in natural subcarrier order and input into the averager. The output of the averager is coupled to a second input terminal of the selector 516. Selector 516 selects the second terminal so that the N smoothing filters 508-1 through 508-N generate N candidate sets of smoothed average channel estimates. The samples of the N candidate sets of smoothed average channel estimates are input to the N inputs of the selector 514 that selects the set of smoothed average channel estimates that produced the lowest error metric. The smoothed average channel estimates arrive in natural order. In this manner, the optimal smoothing filter from a set of candidate filters is selected.

Figure 5B:
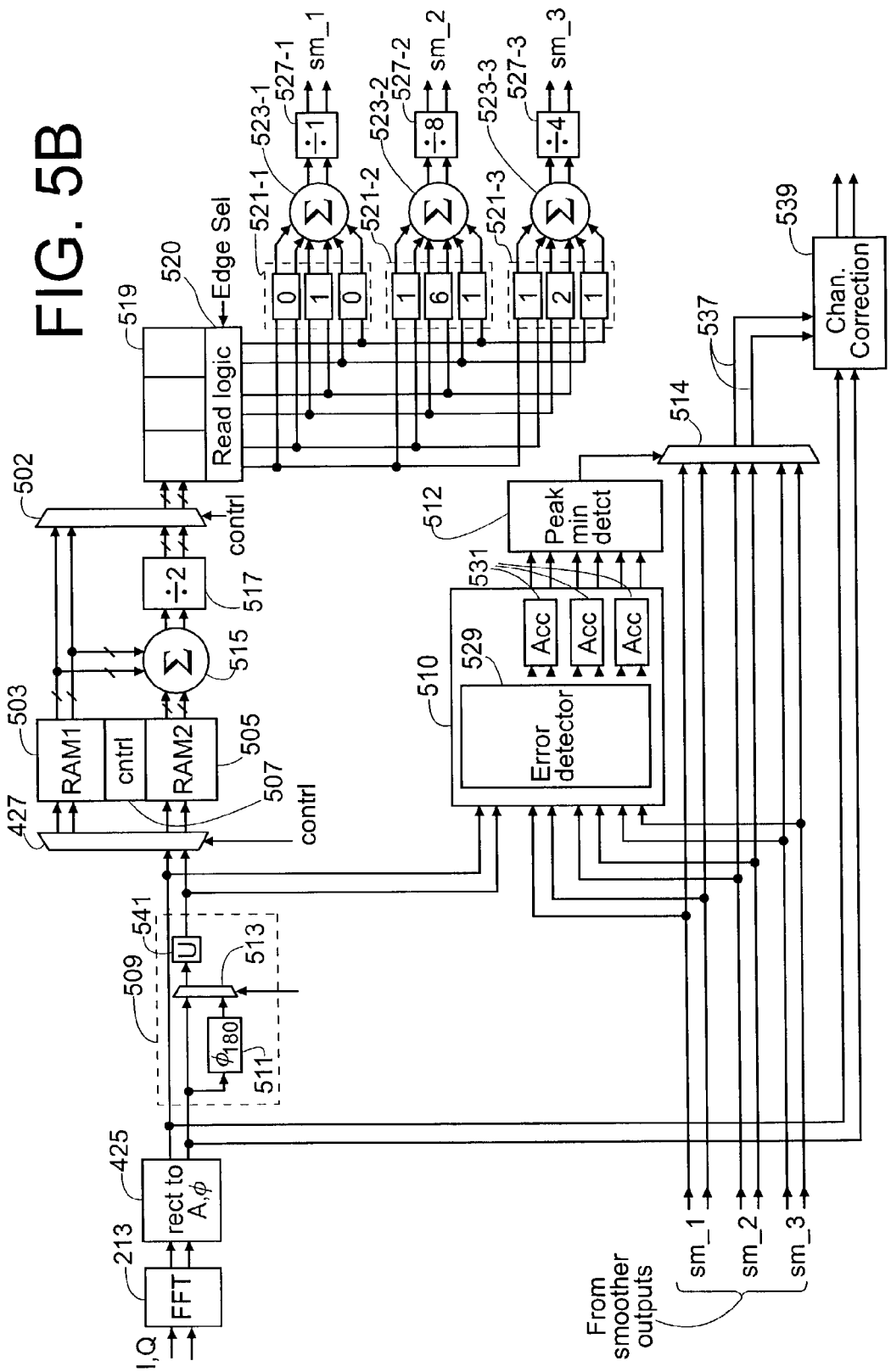
FIG. 5B shows a version of the adaptive channel estimator embodiment of FIG. 5A in more detail.

FIG. 5B is a block diagram of a version of the estimator 500 that shows some of the elements of the block diagram of FIG. 5A in more detail. The amplitude and phase signal paths are shown separately. In this version, memories 1 and 2 are implemented as a first RAM 503 (RAM1) and a second RAM 505 (RAM2), respectively. The two memories are controlled by a memory controller 507 that carries out the read write logic to re-order the sequence according to when the data is read out. Data is read in serially, and read out three subcarriers at a time. During input in of the second set of rough channel estimates into RAM2, the data is read out of RAM1 three rough channel estimates of three adjacent subcarriers at a time with the center subcarrier the same as the subcarrier of the rough channel estimate input into RAM2. When the two RAMs are simultaneously read, they are read out three rough channel estimates of three adjacent subcarriers at a time, in a sequence such that the center subcarrier sequences in natural order.

The factoring unit 435 (FIG. 5A) is shown here as unit 509 applicable for the case the first and second known symbols have known non-zero subcarriers that are +1 or −1, e.g., as specified in the IEEE 802.11 OFDM standards. The rectangular to amplitude/phase converter is a cordic 425. Depending on whether the known symbol subcarrier is +1 or −1, a selector 513 elects the phase of the output of the cordic 425 or the output of a phase shifter 511 that shifts the cordic output phase by 180°. A phase unwrapper unit 541 determines if any phase unwrapping is needed and carries out such needed phase unwrapping. In one embodiment, the phase unwrapping is carried out by adding 180° to the phase using the shifter 511 and selector 513.

The averager averages three pairs of rough channel estimates at a time, and is implemented by using an adder 515 followed by a divide-by-2 circuit 517. A selector 516 selects three channel estimates of adjacent subcarriers either from the averager in natural order, or from RAM1 in the same order as data is input into the RAMs. The set of filters in this version include smoothing filters of smoothing coefficients [0 1 0], [⅛ ¾ ⅛], [¼ ½ ¼], i.e., filters (a), (d), and (c) of Table 1 above. Filter (a) corresponds to no smoothing. A single three-cell parallel-input parallel output register 519 is used for all candidate filters. A Write logic unit 518 writes the three channel estimates of the adjacent subcarriers from selector 516. A read logic unit 520 reads out the register cells in parallel to generate output lines. Which register cells are read out depends on a signal Edge Sel that indicates whether or not the filtering is generating an edge subcarrier. For non-edge subcarriers, the read logic connects all three shift register cells in parallel to the three output lines, while for the edge subcarriers, the center register cell is connected to all output lines. The output lines are weighted by a function of the smoothing coefficients by a set of multipliers, shown as 521-1, 521-2, and 521-3 for the three respective candidate filters. The outputs of each set of multipliers are added by an adder, shown as 523-1, 523-2, and 523-3 for the three respective candidate filters, and the adder output is divided by a common denominator in a divider shown as 524-1, 524-2, and 524-3 for the three respective candidate filters. Alternate embodiments do not have a separate denominator divider, so that the sets of smoothing coefficients are completely contained in the sets of multipliers.

The error metric accumulator 510 includes an error detector 529 that calculates the error metric for each rough channel estimate and a set of accumulators 531 to accumulate the error metric for each of the set of candidate smoothed estimates.

The output of selector 514 after the peak-min detector 512 generates the select signal, e.g., during the arrival into the channel estimator of the second set of samples corresponding to the second known long symbol, are the smoothed channel estimates 537. In the embodiment shown in FIG. 5B, these estimates are stored in a channel correction unit 539. During the reception of the SIGNAL filed and the other payload symbols, the phase/amplitude from cordic 425 are input to the channel corrector 539 for channel correction.

Using the SIGNAL Field to Update Channel Estimates

Referring again to FIG. 1A, in a packet that conforms to one of the IEEE 802.11 OFDM standards, after the two long symbols, the first field in the modulated payload is the SIGNAL field 111 that is modulated using BPSK at a known (relatively low) data rate. The SIGNAL field 111 provides information about the data rate and modulation of the DATA fields in the packet that form the rest of the payload.

In one embodiment, the SIGNAL field is demodulated/decoded after channel equalization using the channel estimates for the subcarriers. The decoded/demodulated information provides for obtaining an additional rough estimate of the channel of each subcarrier. In one embodiment, the DFT of the signals received corresponding to the SIGNAL field are corrected by factoring out the demodulated/decoded then re-encoded/re-modulated SIGNAL field subcarrier-by-subcarrier. This set of additional rough estimates is smoothed by the selected smoothing filter, and each smoothed additional rough channel estimate is averaged with the already obtained smoothed rough channel estimates to provide the channel estimate of each subcarrier to use with the remaining DATA fields in the packet.

While in one embodiment, the rough channel estimates determined from signals received as a result of the SIGNAL field are smoothed prior to averaging with the smoothed rough channel estimates determined by the long symbols, other embodiments may average the rough channel estimates determined from the SIGNAL field with the long-symbol determined smoothed rough estimates without smoothing the SIGNAL-determined rough channel estimates. Furthermore, in one embodiment, the averaging occurs after the three sets of rough (smoothed or not) channel estimates are determined, while in another embodiment, the SIGNAL-determined rough channel estimates are averaged with the averages of the long-symbol determined smoothed rough estimates.

The embodiment shown in FIG. 5A may be modified as follows to provide one embodiments that includes improving the estimates using the SIGNAL field. The first set of rough channel estimates determined using the signal received corresponding to the first long symbol are stored in memory 1. While the first set of rough channel estimates determined using the signal received corresponding to the second long symbol are stored in memory 2, the first set of rough estimates is read out of memory 1 and filtered by the candidate smoothing filters. The filter outputs are fed to the metric error accumulator together with the second set of rough channel estimates. At the end of the second long symbol, the peak min detector generates a signal to the selector to choose the best smoother. During reception of the subcarriers of received signals corresponding to the SIGNAL field, the SIGNAL field subcarriers are stored, and also are channel corrected, demodulated, and decoded. Once decoded, the data is re-coded and re-modulated. As the next data field arrives, the stored subcarriers corresponding to the SIGNAL field are read out, smoothed and averaged with the so-far averaged smoothed channel estimates to update the channel estimates. Note that if there is confidence in the demodulation and decoding of subsequent data, in one embodiment, the channel estimates are continually updated as more data arrives.

Thus several embodiments of a channel estimator and of a method for estimating the channels have been described.

It should be appreciated that although the invention has been described in the context of the OFDM versions of the IEEE 802.11 standard, the invention is not limited to such contexts and may be utilized in various other applications and systems, for example in other systems that use OFDM. OFDM is one example of a multicarrier system in which the signal for transmission is split into a set of subcarriers. The invention may also be applicable to other wireless receivers that use multicarriers.

While an embodiment has been described for operation in an OFDM receiver with RF frequencies in the 5 GHz range, the invention may be embodied in receivers and transceivers operating in other RF frequency ranges. Furthermore, while a transceiver embodiment for operation conforming to the IEEE 802.11a standard has been described, the invention may be embodied in transceivers conforming to other standards and for other applications, including, for example, the IEEE 802.11g standards, proposed IEEE 802.11 OFDM standards, other WLAN standards and other wireless standards. Applications that can be accommodated include IEEE 802.11a COFDM wireless LANs and links, wireless Ethernet, Hiperlan II, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

The IEEE 802.11a and 802.11g standards use OFDM and a preamble with two identical known long symbols that provide for channel estimation. The invention may be used with any data that includes known transmitted symbols or transmitted signals that may be accurately determined at the receiver. For example, the invention may include any number of known symbols at known locations. The symbols need not be identical. Furthermore, the symbols may be known because of the packet structure, or may become known via decision-direction and/or decoded-decision direction.

Note that in the embodiments described above, the output of the Fourier transformer is in rectangular coordinates and is coupled to a rectangular-to-polar converter (a cordic) prior to the processing chain so that the smoothing occurs in the amplitude and phase domain. In alternate embodiments, the output of the Fourier transformer is maintained in rectangular coordinates so that the smoothing occurs in the rectangular (e.g., I-Q) domain.

Furthermore, while the invention has been described using smoothing filters that are each describable as a weighted moving average filter (some filters have equal coefficients), other embodiments may use one or more other smoothing filters. Many types of smoothing filters are known in the art.

Embodiments have been described in which the smoothed rough channel responses determined from the first long symbol are stored. In an alternate version, the rough channel estimates are stored, and the smoothing is then performed on the stored rough channel responses. In another embodiment, the received carriers are stored prior to the factoring out of the known first long symbol. Thus, in general, a function of each of the rough channel estimates is kept in storage. Other variations also are possible. For example, the order of averaging and smoothing may be reversed, so that in one alternate embodiment, the received subcarriers' rough channel estimates may be averaged and then smoothed. In another, the received signals may be averaged, then converted to average rough channel estimates and then smoothed.

While one embodiment describes using a parallel-in, parallel out register to implement the smoothing filter, an alternate embodiment uses a serial in, parallel out shift register. When such a shift register is used in the adaptive implementations such as that of FIG. 5A, the error metric accumulator includes a delay to the input from the factoring unit 435 to match any delay a shift register smoothing filter implementation introduces. Furthermore, using a shift register produces smoothing filter outputs that are in natural order. In one embodiment, the error metric accumulator includes a memory that provides for reordering the output from the factoring unit 435.

Note that while the embodiments shown herein use the forward discrete Fourier transform implemented as an FFT, those on the art will recognize that the DFT/FFT, IDFT/IFFT may be considered to be identical.

Furthermore, while one embodiment of the invention smoothes the rough channel estimates obtained from each long symbol, in an alternate embodiment, only the rough channel estimates from one of the long symbols is smoothed.

Furthermore, while one embodiment of the invention has been described using smoothing filters that are each describable as a weighted moving average filter (some filters have equal coefficients), other embodiments may use one or more other smoothing filters. Many types of smoothing filters are known in the art.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. An apparatus for determining an estimate of the channel of each subcarrier in a wireless receiver for receiving OFDM data packets, the data packets transmitted as a set of subcarriers, the wireless receiver including:
   receive electronics to wirelessly receive and digitize a wirelessly transmitted OFDM data packet that includes a preamble having a known first symbol and a known second symbol, the receive electronics having an output outputting a set of received data samples, and
   a Fourier transformer having an input coupled to the output of the receive electronics, and an output forming a discrete Fourier transform (DFT) of the set of received data samples, the DFT of the received data samples forming a set of subcarriers corresponding to the set of received data samples,
   the apparatus including:
   a switch unit having an input coupled to the receive electronics accepting a function of a first set of received samples that corresponds to the first known symbol or of a second set of received samples that corresponds to the second known symbol, and having a first output and a second output, the switch unit connecting the input to the first output when the input is accepting the function of the first set of received samples and connecting the input to the second output when the input is accepting the function of the second set of received samples;
   a memory unit coupled to the first output of the switch unit, such that the memory unit is to store the function of the first set of received samples that corresponds to the first known symbol;
   an averaging unit having a first input coupled to the memory and a second input coupled to the second output of the switch unit, such that the averaging unit forms the average of the function of the first and second sets of received samples;
   a factoring unit having an input coupled to the output of the receiver's Fourier transformer, the factoring unit having an output producing a set of rough channel estimates, the factoring unit to factor out the set of subcarriers corresponding to the first known symbol or the second known symbol from the set of subcarriers determined by transforming the first or second set of received samples that corresponds to the first or second known symbol; and
   a smoothing filter having an input coupled to the output of the factoring unit to form smoothed channel estimates, such that the smoothed channel estimate for a particular subcarrier includes a contribution from channel estimates of the particular subcarrier's one or more immediate neighbors to take advantage of correlation that may exist between the particular subcarrier's channel and the channels of that subcarrier's one or more immediate neighbors.

2. An apparatus as recited in claim 1,
   wherein the switch unit input is coupled to the Fourier transformer, and
   wherein the function of the first or second set of samples is the respective set of subcarriers determined by transforming the first or second sets of samples, respectively.

3. An apparatus as recited in claim 1, wherein the function of the part of the received data that is stored is the part of the received data.

4. An apparatus as recited in claim 1,
   wherein the switch unit input is coupled to the output of the factoring unit and wherein the function of the first or second set of samples that is stored is the first or second set of rough channel estimates, respectively.

5. An apparatus as recited in claim 1, wherein the input of the smoothing filter is connected to the output of the factoring unit, and wherein the output of the smoothing filter is connected to the second input of the averaging unit such that the smoothing is of rough channel estimates determined respectively using the first or second set of samples, and such that the averaging is of the smoothed rough channel estimates.

6. An apparatus as recited in claim 1, wherein the output of the averaging unit is coupled to the input of the factoring unit such that the factoring is of the average of the subcarriers, wherein the smoothing is of average channel estimates for each subcarrier determined using the average of the corresponding first and second sets of samples, and wherein the smoothing filter smoothes the averaged channel estimates.

7. An apparatus as recited in claim 1, wherein the smoothing filter is a weighted moving average filter defined by a set of smoothing coefficients.

8. An apparatus as recited in claim 7, wherein the smoothing coefficients of the moving average filter are all the same.

9. An apparatus as recited in claim 1, wherein the subcarriers include edge subcarriers and non-edge subcarriers, and wherein the smoothing filter applies different smoothing to determine the smoothed channel estimate for the edge subcarriers than for the non-edge subcarriers.

10. An apparatus as recited in claim 1, wherein the smoothing filter is a weighted moving average filter defined by a set of smoothing coefficients, and wherein the number of edge subcarriers for which smoothing is different depends on the number of smoothing coefficients in the smoothing filter.

11. An apparatus as recited in claim 1,
wherein the switch unit includes a set of switches each having an input and two outputs, such that the switch unit switches in parallel,
wherein the memory unit has a set of parallel inputs and outputs, and
wherein the factoring unit includes a set of factoring elements each having an input and an output, one for each subcarrier such that the factoring unit factors in parallel.

12. An apparatus as recited in claim 1,
wherein the memory includes a first memory and a second memory,
wherein the first output of the switch unit is coupled to the first memory and the second output of the switch unit is coupled to the second memory, such that the first memory is to store the function of the first set of received samples that corresponds to the first known symbol and the second memory is to store the function of the second set of received samples that corresponds to the second known symbol,
wherein the first input of the averaging unit is coupled to the first memory and the second input of the averaging unit is coupled to the second memory such that the coupling of the second averaging unit input to the second output of the switch unit is via the second memory;
wherein the Fourier transformer has a serial output that outputs sequentially subcarrier by subcarrier, such that the first and second memories are each filled sequentially in the subcarrier order of the output of the Fourier transformer;
wherein the switch unit includes a single switching element such that the switch unit sequentially switches subcarrier by subcarrier, and
wherein the factoring unit includes a single factoring element such that the factoring unit sequentially factors subcarrier by subcarrier.

13. An apparatus as recited in claim 12, wherein the data out of the Fourier transformer is in non-natural order, and wherein each of the first and second memory is read out in natural order.

14. An apparatus as recited in claim 1, wherein the OFDM data packets conform to one of the IEEE 802.11 standards that uses OFDM.

15. An apparatus for determining an estimate of the channel of each subcarrier in a wireless receiver for receiving OFDM data packets, the data packets transmitted as a set of subcarriers, the wireless receiver including:
receive electronics to wirelessly receive and digitize a wirelessly transmitted OFDM data packet that includes a preamble having a known first symbol and a known second symbol, the receive electronics having an output outputting a set of received data samples, and
a Fourier transformer having an input coupled to the output of the receive electronics, and an output forming a discrete Fourier transform (DFT) of the set of received data samples, the DFT of the received data samples forming a set of subcarriers corresponding to the set of received data samples,
the apparatus comprising:
a factoring unit having an input coupled to the output of the Fourier transformer and an output producing rough channel estimates, subcarrier by subcarrier, the factoring unit to factor out, subcarrier by subcarrier, each of the set of subcarriers corresponding to the known first or second known symbol from each subcarrier of the set of subcarriers determined by transforming a first or second set of received samples that corresponds to the first or second known symbol, respectively, to produce a first set of rough channel estimates and a second set of rough channel estimates, respectively;
a first memory and a second memory to respectively store the first and the second sets of rough channel estimates, each memory having an input and an output;
a switch unit having an input coupled to the factoring unit and two outputs coupled to the first and second memory inputs, respectively, the switch unit connecting the switch unit input to the first memory input when the switch input is accepting rough channel estimates of the first set, and connecting the switch unit input to the second memory input when the switch input is accepting rough channel estimates of the second set;
an averaging unit having a first input coupled to the first memory output, a second input coupled to the second memory output, and an output;
a first selector having a first input coupled to the first memory output, a second input coupled to the averager output, and an output, the output connected to the first input when the switch input is accepting rough channel estimates of the second set, and to the second input thereafter;
a set of candidate smoothing filters each having an input coupled to the output of the selector unit and an output to form one of a set of candidate smoothed rough channel estimates;
an error metric accumulator with one input coupled to each of the outputs of the candidate filters, an input coupled to the output of the factoring unit, and a set of outputs each generating an accumulated error metric that indicates how close one of the candidate smoothed rough channel estimates is to the corresponding rough channel estimate of the second set when the switch input is accepting rough channel estimates of the second set;
a detector having an input coupled to the accumulator output and an output to detect the smallest accumulated error metric indicating which of the sets of candidate smoothed rough channel estimates is closest to the second set of rough channel estimates; and
a second selector having a set of inputs couples to each of the candidate filter outputs, a select input coupled to the detector output, and an output generating a set of smoothed channel estimates when the first and second memory are read after the second memory is full,
such that the smoothed channel estimate for a particular subcarrier includes a contribution from channel estimates of the particular subcarrier's one or more immediate neighbors to take advantage of correlation that may exist between the particular subcarrier's channel and the channels of that subcarrier's one or more immediate neighbors according to the smoothing filter of the candidate smoothing filters that when smoothing the first set of rough channel estimates produces smoothed channel estimates that best predict the second set of rough channel estimates.

16. An apparatus as recited in claim 15, wherein the Fourier transformer forms a set of subcarriers in rectangular coordinate form, the apparatus further comprising:
a converter coupled to the Fourier transformer output to convert the output of the Fourier transformer to amplitude and phase form;

such that the factoring unit input is coupled to the coupled to the Fourier transformer output via the converter, and such that the smoothing is carried out in the polar amplitude and phase domain.

17. An apparatus as recited in claim 15, wherein the factoring unit produces each set of rough channel estimates sequentially subcarrier by subcarrier in non-natural order, wherein the first and second memory are input in the non-natural order, and wherein the first and second memory are read out to such that the selector outputs smoothed channel estimates sequentially subcarrier by carrier in natural order after the second set of rough channel estimates is stored in the second memory.

18. An apparatus for determining an estimate of the channel of each subcarrier in a wireless receiver for receiving OFDM data packets, the data packets transmitted as a set of subcarriers, the wireless receiver including:
  receive electronics to wirelessly receive and digitize a wirelessly transmitted OFDM data packet that includes a preamble having a known first symbol and a known second symbol, the receive electronics having an output outputting a set of received data samples, and
  a Fourier transformer having an input coupled to the output of the receive electronics, and an output forming a discrete Fourier transform (DFT) of the set of received data samples, the DFT of the received data samples forming a set of subcarriers corresponding to the set of received data samples,
  the apparatus comprising:
  a factoring unit having an input coupled to the output of the Fourier transformer and an output producing rough channel estimates, subcarrier by subcarrier, the factoring unit to factor out, subcarrier by subcarrier, each of the set of subcarriers corresponding to the known first or second known symbol from each subcarrier of the set of subcarriers determined by transforming a first or second set of received samples that corresponds to the first or second known symbol, respectively, to produce a first set of rough channel estimates and a second set of rough channel estimates, respectively;
  a first memory and a second memory to respectively store the first and the second sets of rough channel estimates, each memory having an input and an output;
  a switch unit having an input coupled to the factoring unit and two outputs coupled to the first and second memory inputs, respectively, the switch unit connecting the switch unit input to the first memory input when the switch input is accepting rough channel estimates of the first set, and connecting the switch unit input to the second memory input when the switch input is accepting rough channel estimates of the second set;
  an averaging unit having a first input coupled to the first memory output, a second input coupled to the second memory output, and an output; and
  a smoothing filter having an input coupled to the output of the averager unit and an output to form a set of average smoothed channel estimates,
  such that the smoothed channel estimate for a particular subcarrier includes a contribution from channel estimates of the particular subcarrier's one or more immediate neighbors to take advantage of correlation that may exist between the particular subcarrier's channel and the channels of that subcarrier's one or more immediate neighbors.

19. An apparatus as recited in claim 18, wherein the Fourier transformer forms a set of subcarriers in rectangular coordinate form, the apparatus further comprising:
  a converter coupled to the Fourier transformer output to convert the output of the Fourier transformer to amplitude and phase form;
  such that the factoring unit input is coupled to the coupled to the Fourier transformer output via the converter, and such that the smoothing is carried out in the polar amplitude and phase domain.

20. An apparatus as recited in claim 18, wherein the factoring unit produces each set of rough channel estimates sequentially subcarrier by subcarrier in non-natural order, wherein the first and second memory are input in the non-natural order, and wherein the first and second memory are read out to such that the smoothing filter outputs smoothed channel estimates sequentially subcarrier by carrier in natural order after the second set of rough channel estimates is stored in the second memory.

21. A method for estimating channel characteristics in an OFDM radio receiver, the method comprising the steps of:
  receiving data as a result of a transmission of an OFDM data packet that includes a preamble containing a plurality of known signals at known locations within the packet;
  transforming a part of the received data that corresponds to the first transmitted known signal to form a first set of received subcarriers that correspond to the first transmitted known signal;
  factoring out the transmitted subcarriers of the first transmitted known signal from the received subcarriers to form a first set of rough channel estimates for the subcarriers;
  storing a function of the first set of rough channel estimates for the subcarriers;
  transforming a part of the received data that corresponds to the second transmitted known signal to form a second set of received subcarriers that correspond to the second transmitted known signals;
  factoring out the transmitted subcarriers of the second transmitted known signal from the received subcarriers of the second set to form a second set of rough channel estimates for the subcarriers;
  forming an average of the first and second sets of rough channel estimates using the stored function to form a set of averaged rough channel estimates; and
  smoothing the averaged channel estimates according to a smoothing filter to form a set of smoothed channel estimates,
  such that the smoothed channel estimate for a subcarrier includes a contribution from rough channel estimates of the particular subcarrier's one or more immediate neighbors to take advantage of correlation that may exist between the particular subcarrier's channel and the channels of that subcarrier's one or more immediate neighbors.

22. A method as recited in claim 21, further comprising:
  storing a function of the second set of rough channel estimates for the subcarriers;
  wherein each storing of the function of each of the first and second sets is sequentially subcarrier-by-subcarrier into a first and a second memory, respectively, the sequential storing in a non-natural order, and
  wherein forming the average of the first and second sets of rough channel estimates includes reading the first and second memories in a natural order.

23. A method as recited in claim 21, further comprising:
  converting each of the transformed parts of the received data that corresponds to the first and second transmitted known signals, respectively, into amplitude and phase form, such that the first and second sets of subcarriers are provided in amplitude and phase form, and such that the smoothing occurs in the amplitude and phase domain.

24. A method as recited in claim 21, wherein the smoothing is in the rectangular coordinate domain.

25. A method as recited in claim 21, wherein the function stored is the first set of rough channel estimates.

26. A method as recited in claim 21, wherein the function stored is the first set of received subcarriers that correspond to the first transmitted known signal.

27. A method as recited in claim 21, wherein the function stored is the part of the received data that corresponds to the first transmitted known signal.

28. A method as recited in claim 21, wherein the OFDM data packet conforms to one of the IEEE 802.11 standards that uses OFDM.

29. A method as recited in claim 21, wherein the smoothing filter is a weighted moving average filter defined by a set of smoothing coefficients.

30. A method as recited in claim 29, wherein the smoothing coefficients of the moving average filter are all the same.

31. A method as recited in claim 21, wherein the subcarriers include edge subcarriers and non-edge subcarriers, and wherein the smoothing applies different smoothing to determine the smoothed channel estimate for the edge subcarriers than for the non-edge subcarriers.

32. A method as recited in claim 21, wherein the smoothing filter is a weighted moving average filter defined by a set of smoothing coefficients, and wherein the number of edge subcarriers for which smoothing is different depends on the number of smoothing coefficients in the smoothing filter.

33. A method as recited in claim 21,
wherein the smoothing filter is selected from a set of candidate smoothing filters according to how well the channel estimates produced by applying each candidate filter to the first set of rough channel estimates predict the part of the received data corresponding to the second transmitted known signal.

34. A method for estimating channel characteristics in an OFDM radio receiver, the method comprising the steps of:
receiving data as a result of a transmission of an OFDM data packet that includes a preamble containing a plurality of known signals at known locations within the packet;
transforming a part of the received data that corresponds to the first transmitted known signal to form a first set of received subcarriers that correspond to the first transmitted known signal;
factoring out the transmitted subcarriers of the first transmitted known signal from the received subcarriers to form a first set of rough channel estimates for the subcarriers;
smoothing the rough channel estimates of the first set according to a smoothing filter to form a first set of smoothed rough channel estimates;
storing a function of the first set of rough channel estimates for the subcarriers;
transforming a part of the received data that corresponds to the second transmitted known signals to form a second set of received subcarriers that correspond to the second transmitted known signals;
factoring out the transmitted subcarriers of the second transmitted known signal from the received subcarriers of the second set to form a second set of rough channel estimates for the subcarriers;
smoothing the rough channel estimates of the second set according to a smoothing filter to form a second set of smoothed rough channel estimates; and
forming an average of the first and second sets of smoothed rough channel estimates using the stored function to form a set of averaged channel estimates,
such that the smoothed channel estimate for a subcarrier includes a contribution from rough channel estimates of the particular subcarrier's one or more immediate neighbors to take advantage of correlation that may exist between the particular subcarrier's channel and the channels of that subcarrier's one or more immediate neighbors.

35. A method as recited in claim 34, wherein the function stored is the first set of smoothed rough channel estimates.

36. A method as recited in claim 34, wherein the function stored is the first set of rough channel estimates.

37. A method as recited in claim 34, wherein the function stored is the first set of received subcarriers that correspond to the first transmitted known signal.

38. A method as recited in claim 34, wherein the function stored is the part of the received data that corresponds to the first transmitted known signal.

39. A method as recited in claim 34, wherein the OFDM data packet conforms to one of the IEEE 802.11 standards that uses OFDM.

40. A method as recited in claim 34, wherein the smoothing filter is a weighted moving average filter defied by a set of smoothing coefficients.

41. A method as recited in claim 40, wherein the smoothing coefficients of the moving average filter are all the same.

42. A method as recited in claim 34, wherein the subcarriers include edge subcarriers and non-edge subcarriers, and wherein the smoothing applies different smoothing to determine the smoothed channel estimate for the edge subcarriers than for the non-edge subcarriers.

43. A method as recited in claim 34, wherein the smoothing filter is a weighted moving average filter defined by a set of smoothing coefficients, and wherein the number of edge subcarriers for which smoothing is different depends on the number of smoothing coefficients in the smoothing filter.

44. A method as recited in claim 34, further comprising:
storing a function of the second set of rough channel estimates for the subcarriers;
wherein each storing of the function of each of the first and second sets is sequentially subcarrier-by-subcarrier into a first and a second memory, respectively, the sequential storing in a non-natural order, and
wherein forming the average of the first and second sets of rough channel estimates includes reading the first and second memories in a natural order.

45. A method as recited in claim 34, further comprising:
converting each of the transformed parts of the received data that corresponds to the first and second transmitted known signals, respectively, into amplitude and phase form, such that the first and second sets of subcarriers are provided in amplitude and phase form, and such that the smoothing occurs in the amplitude and phase domain.

46. A method as recited in claim 34, wherein the smoothing is in the rectangular coordinate domain.

47. A method as recited in claim 34,
wherein the smoothing filter is selected from a set of candidate smoothing filters according to how well the channel estimates produced by applying each candidate filter to the first set of rough channel estimates predict the part of the received data corresponding to the second transmitted known signal.

48. A method for estimating channel characteristics in a multicarrier wireless receiver, the method comprising the steps of:
- receiving multicarrier data as a result of a wireless transmission of data that includes one or more known signals;
- determining one or more sets of received subcarriers from one or more parts of the received multicarrier data that correspond to one or more of the known signals of the transmitted data;
- factoring out the transmitted subcarriers of the one or more of the transmitted known signals from the received subcarriers to form one or more sets of rough channel estimates for the subcarriers; and
- smoothing the rough channel estimates according to a first smoothing filter to form smoothed channel estimates,
- such that the smoothed channel estimate for a particular subcarrier includes a contribution from rough channel estimates of the particular subcarrier's one or more immediate neighbors to take advantage of correlation that may exist between the particular subcarrier's channel and the channels of that subcarrier's one or more immediate neighbors.

49. A method as recited in claim 48, wherein the transmitted data includes a plurality of known signals, and wherein the smoothing is of average rough channel estimates, the averaging being over data determined from each respective part of the received multicarrier data corresponding to each of the plurality of known signals.

50. A method as recited in claim 49, wherein the average rough channel estimates are produced by factoring out the respective known signal from each set of received subcarriers corresponding to each of the known signals and averaging the sets of rough channel estimates.

51. A method as recited in claim 49, wherein each of the plurality of known signals is the same known signal, and wherein the set of average rough channel estimates is produced by averaging the sets of received subcarriers determined from each respective part of the received multicarrier data corresponding to each of the plurality of known signals, and factoring out from the set of average received subcarriers the subcarriers that correspond to the known signal.

52. A method as recited in claim 51, wherein the set of average received subcarriers is determined by averaging the parts of the received data and determining the set of received subcarriers from the averaged parts of the received multicarrier data.

53. A method as recited in claim 48, wherein the transmitted data includes a plurality of known signals, and wherein the smoothed channel estimates are produced by factoring out the respective known signal from each set of received subcarriers corresponding to each of the known signals to produce a plurality of sets of rough channel estimates, smoothing the rough channel estimates of each set to produce a plurality of sets of smoothed rough channel estimates, and average the sets of smoothed rough channel estimates.

54. A method as recited in claim 48, wherein the smoothing is in the amplitude and phase domain.

55. A method as recited in claim 48, wherein the smoothing is in the rectangular coordinate domain.

56. A method as recited in claim 48, wherein the transmitted data further includes an additional field coded at a coding data rate, the method further comprising:
- correcting a part of the received data that corresponds to the additional field using a function of the rough channel estimates;
- demodulating/decoding the received data corresponding to the additional field;
- determining an additional channel estimate for each of the set of subcarriers using the demodulated/decoded field and the part of the received data that corresponds to the field; and
- updating using the additional channel estimates to produce updated channel estimates, the updated channel estimates incorporating the additional channel estimates and the smoothed channel estimates.

57. A method as recited in claim 56, wherein the additional field is modulated at a relatively low data rate, and wherein the determining of an additional channel estimate includes re-coding/re-modulating the demodulated/decoded data.

58. A method as recited in claim 56,
wherein the a function of the rough channel estimates is the set of smoothed channel estimates, and
wherein the updating includes:
- smoothing the additional channel estimates according to an additional smoothing filter to produce smoothed additional channel estimates; and
- averaging the smoothed channel estimates with the smoothed additional channel estimates to produce the updated channel estimates.

59. A method as recited in claim 58, wherein the additional smoothing filter is the first smoothing filter.

60. A method as recited in claim 56, wherein the updating includes averaging the rough channel estimates with the additional channel estimates to produce averaged channel estimates and smoothing the averaged channel estimates according to the first smoothing filter to produce the updated channel estimates.

61. A method as recited in claim 48, wherein the first filter is a weighted moving average filter defined by a set of smoothing coefficients.

62. A method as recited in claim 61, wherein the smoothing coefficients of the moving average filter are all the same.

63. A method as recited in claim 48, wherein the subcarriers include edge subcarriers and non-edge subcarriers, and wherein the smoothing applies different smoothing to determine the smoothed channel estimate for the edge subcarriers than for the non-edge subcarriers.

64. A method as recited in claim 48, wherein the first filter is a weighted moving average filter defined by a set of smoothing coefficients, and wherein the number of edge subcarriers for which smoothing is different depends on the number of smoothing coefficients in the first smoothing filter.

65. A method as recited in claim 49,
wherein the plurality of known signals includes a first known signal and one or more later known signals, and wherein the smoothing filter is selected from a set of candidate smoothing filters according to how well each candidate set of smoothed channel estimates determined by applying a respective candidate filter to rough channel estimates determined from the part of the received data corresponding to the first known signal predicts the one or more parts of the received data corresponding to one or more of the later known signals.

66. A method for estimating channel characteristics in a multicarrier wireless receiver, the method comprising:
    determining a channel estimate for each of a set of subcarriers by receiving multicarrier data as a result of a wireless transmission of data that includes a known signal, the determining using a part of the received data that corresponds to the known signal; and
    smoothing the channel estimates according to a first smoothing filter to form smoothed channel estimates, such that the smoothed channel estimate for a particular subcarrier includes a contribution from the channel estimates of the particular subcarrier's one or more immediate neighbors to take advantage of correlation that may exist between the particular subcarrier's channel and the channels of that subcarrier's one or more immediate neighbors.

67. A method as recited in claim 66, wherein the transmitted data further includes at least one additional known signal, and wherein each smoothed channel estimate is a smoothed version of the average of sets of channel estimates, each set of channel estimates determined using a respective part of the received data that corresponds to a corresponding one of the known signals.

68. A method as recited in claim 67, wherein the smoothing is of a set of averaged channel estimates formed by averaging channel estimates determined using a respective part of the received data that corresponds to a corresponding one of the known signals.

69. A method as recited in claim 67, wherein the smoothing is of channel estimates determined using a respective part of the received data that corresponds to a corresponding one of the known signals, and wherein the averaging is of the smoothed channel estimates.

70. A method as recited in claim 67, wherein the determining a channel estimate for each subcarrier determines an average channel estimate for the subcarrier using the average of the corresponding parts of the received data that corresponds to the known signals, and wherein the smoothing is of the averaged channel estimates.

71. A method as recited in claim 66, wherein the transmitted data further includes a field coded at a coding data rate, the method further comprising:
    correcting a part of the received data that corresponds to the field using the channel estimates;
    demodulating/decoding the field;
    determining an additional channel estimate for each of the set of subcarriers using the demodulated/decoded field and the part of the received data that corresponds to the field; and
    updating using the additional channel estimates to produce updated channel estimates, the updated channel estimates incorporating the additional channel estimates and the smoothed channel estimates.

72. A method as recited in claim 71, wherein the field is modulated at a relatively low data rate, and wherein the determining of an additional channel estimate includes re-coding/re-modulating the demodulated/decoded data.

73. A method as recited in claim 71,
    wherein the correcting uses the smoothed channel estimates, and
    wherein the updating includes:
        smoothing the additional channel estimates according to an additional smoothing filter to produce smoothed additional channel estimates; and
        averaging the smoothed channel estimates with the smoothed additional channel estimates to produce the updated channel estimates.

74. A method as recited in claim 73, wherein the additional smoothing filter is the first smoothing filter.

75. A method as recited in claim 71, wherein the updating includes averaging the channel estimates with the additional channel estimates to produce averaged channel estimates and smoothing the averaged channel estimates according to the first smoothing filter to produce the updated channel estimates.

76. A method of determining channel estimates for each of a set of subcarriers in a multicarrier radio receiver from data received at the receiver as a result of transmission of multicarrier data that includes a first and a second known signal, the method comprising:
    determining from a part of the received data corresponding to the first known signal a set of candidate sets of channel estimates, determining each respective candidate set including smoothing a first set of rough channel estimates using one of a set of candidate smoothing methods;
    comparing how well each candidate set of channel estimates predicts a part of the received data corresponding to the first known signal to select the candidate set that best predicts and to select the corresponding smoothing method; and
    using the selected corresponding smoothing method to smooth the rough channel estimates determined from one or both of the known signals to produce smoothed channel estimates,
    such that the smoothed channel estimate for a particular subcarrier can include a contribution from rough channel estimates of the particular subcarrier's one or more immediate neighbors to take advantage of any correlation that may exist between the particular subcarrier's channel and the channels of that subcarrier's one or more immediate neighbors.

77. A method as recited in claim 76, wherein one of the candidate smoothing methods is not smoothing the rough channel estimates, such that in the case that the selected smoothing method is not smoothing, the smoothed channel estimate for a particular subcarrier does not include a contribution from rough channel estimates of the particular subcarrier's one or more immediate neighbors.

78. A method as recited in claim 76, wherein the determining of the candidate sets of channel estimates further includes:
    determining a set of subcarriers corresponding to the part of the received data corresponding to the first known signal;
    factoring out the subcarriers of the first known signal from the determined set of subcarriers for the first set of rough channel estimates; and
    smoothing the first set of rough channel estimates using each of the set of candidate smoothing methods,
    the method further comprising:
    storing a function of the part of the received data corresponding to the first known signal.

79. A method as recited in claim 76, wherein the comparing how well each candidate set of channel estimates includes:
    determining a set of rough channel estimates from a part of the received data corresponding to the second known signal; and
    comparing each candidate set of channel estimates with the set of rough channel estimates according to a metric to select the candidate set that is closest to the set of rough channel estimates.

80. A method as recited in claim 78, wherein the comparing how well each candidate set of channel estimates includes:
  determining a set of rough channel estimates from a part of the received data corresponding to the second known signal; and
  comparing each candidate set of channel estimates with the set of rough channel estimates according to a metric to select the candidate set that is closest to the set of rough channel estimates.

81. A method as recited in claim 80, further comprising:
  averaging the sets of rough channel estimates from the parts of the received data corresponding to the first and second known signal; and
  smoothing the averaged rough channel estimates using the smoothing filter that produced the selected closest candidate set.

82. A method as recited in claim 81, further comprising:
  storing the function of the part of the received data corresponding to the second known signal.

83. A method as recited in claim 82, wherein the storing is sequential subcarrier-by-subcarrier in an non-natural order, and wherein the averaging includes reading the sets rough channel estimates such that the smoothing generates a sequence of channel estimates in a natural order.

84. A method as recited in claim 76, wherein the transmitted multicarrier data is an OFDM signal conforming to one of the IEEE 802.11 OFDM standards, the OFDM signal including a preamble containing a first and a second long symbols that respectively include the first and second known signals.

85. An apparatus for estimating channel characteristics in a multicarrier wireless receiver, the wireless receiver including receive electronics to receive multicarrier data as a result of a wireless transmission of data that includes a known signal, and a Fourier transformer transforming a part of the received data to form a set of subcarriers, the apparatus comprising:
  a factoring unit coupled to the Fourier transformer of the receiver to factor out the set of subcarriers corresponding to the known transmitted signal from the set of subcarriers determined by transforming a part of the received data that corresponds to the known signal; and
  a smoothing filter coupled to the factoring unit,
  such that the smoothing filter outputs a set of smoothed channel estimates, the smoothed channel estimate for a particular subcarrier including a contribution from channel estimates of the particular subcarrier's one or more immediate neighbors to take advantage of correlation that may exist between the particular subcarrier's channel and the channels of that subcarrier's one or more immediate neighbors.

86. An apparatus as recited in claim 85, wherein the transmitted data further includes an additional known signal, and wherein the factoring unit is also to factor out the set of subcarriers corresponding to the additional known transmitted signal from the set of subcarriers determined by transforming a part of the received data that corresponds to the additional known signal, the apparatus further comprising:
  a memory unit for storing a function of the part of the received multicarrier data corresponding to the known signal; and
  an averaging unit having a first and second input, the first input coupled to the memory unit and the second input coupled to the receive electronics,
  such that each smoothed channel estimate is a smoothed version of the average of the sets of channel estimates respectively determined using the part of the received data that corresponds to the known signal and a part of the received data that corresponds to the additional known signal.

87. An apparatus as recited in claim 86, further comprising:
  a switch unit having an input coupled to the receive electronics accepting the function of the part of the received data corresponding to the known signal of the known symbol or the function of the part of the received data corresponding to the additional known signal, and having a first output coupled to the memory unit and a second output coupled to the averaging unit, the switch unit coupling the input to the memory unit when the input is accepting the function of the part of the received data corresponding to the known signal and coupling the input to the second input of the averaging unit when the input is accepting the function of the part of the received data corresponding to the additional known signal.

88. An apparatus as recited in claim 87,
  wherein the switch unit includes a set of switches each having an input and two outputs, such that the switch unit switches in parallel,
wherein the memory unit has a set of parallel inputs and outputs, and
wherein the factoring unit includes a set of factoring elements each having an input and an output, one for each subcarrier such that the factoring unit factors in parallel.

89. An apparatus as recited in claim 87,
  wherein the memory includes a first memory and a second memory,
  wherein the first output of the switch unit is coupled to the first memory and the second output of the switch unit is coupled to the second memory, such that the first memory is to store the function of a first set of received samples that corresponds to the first known symbol and the second memory is to store the function of a second set of received samples that corresponds to the second known symbol,
  wherein the first input of the averaging unit is coupled to the first memory and the second input of the averaging unit is coupled to the second memory such that the coupling of the second averaging unit input to the second output of the switch unit is via the second memory;
  wherein the Fourier transformer has a serial output that outputs sequentially subcarrier by subcarrier, such that the first and second memories are each filled sequentially in the subcarrier order of the output of the Fourier transformer;
  wherein the switch unit includes a single switching element such that the switch unit sequentially switches subcarrier by subcarrier, and
  wherein the factoring unit includes a single factoring element such that the factoring unit sequentially factors subcarrier by subcarrier.

90. An apparatus as recited in claim 89, wherein the data out of the Fourier transformer is in non-natural order, and wherein each of the first and second memory is read out in natural order.

91. An apparatus as recited in claim 86,
  wherein the function of the part of the received data that is stored is the set of subcarriers determined by transforming the part of the received data.

92. An apparatus as recited in claim 86, wherein the function of the part of the received data that is stored is the part of the received data.

93. An apparatus as recited in claim 86, wherein the second input of the averaging unit is connected to the output of the factoring unit such that the channel estimates determined using a respective part of the received data are each determined prior to the averaging by the averaging unit.

94. An apparatus as recited in claim 93, wherein the function of the part of the received data that is stored is the output of the factoring unit formed during the reception of the part of the received data.

95. An apparatus as recited in claim 86, wherein the input of the smoothing filter is connected to the output of the factoring unit, and wherein the output of the smoothing filter is connected to the second input of the averaging unit such that the smoothing is of rough channel estimates determined using a respective part of the received data and the averaging is of the smoothed rough channel estimates.

96. An apparatus as recited in claim 93, wherein the function of the part of the received data that is stored is the output of the factoring unit formed during the reception of the part of the received data.

97. An apparatus as recited in claim 93, wherein the function of the part of the received data that is stored is the output of the smoothing filter formed during the reception of the part of the received data.

98. An apparatus as recited in claim 86, wherein the output of the averaging unit is coupled to the input of the factoring unit such that the factoring is of the average of the subcarriers, wherein the smoothing is of average channel estimates for each subcarrier determined using the average of the corresponding parts of the received data that corresponds to the known signals, and wherein the smoothing filter smoothes the averaged channel estimates.

99. An apparatus as recited in claim 85, wherein the smoothing filter is a weighted moving average filter defined by a set of smoothing coefficients.

100. An apparatus as recited in claim 85, wherein the smoothing is in the amplitude and phase domain.

101. An apparatus as recited in claim 85, wherein the smoothing is in the rectangular coordinate domain.

102. An apparatus as recited in claim 99, wherein the smoothing coefficients of the moving average filter are all the same.

103. An apparatus as recited in claim 85, wherein the subcarriers include edge subcarriers and non-edge subcarriers, and wherein the smoothing filter applies different smoothing to determine the smoothed channel estimate for the edge subcarriers than for the non-edge subcarriers.

104. An apparatus as recited in claim 85, wherein the smoothing filter is a weighted moving average filter defined by a set of smoothing coefficients, and wherein the number of edge subcarriers for which smoothing is different depends on the number of smoothing coefficients in the smoothing filter.

\* \* \* \* \*

UNITED STATES PATENT AND TRADEMARK OFFICE
CERTIFICATE OF CORRECTION

PATENT NO. : 7,161,896 B1
APPLICATION NO. : 10/217117
DATED : January 9, 2007
INVENTOR(S) : Hart et al.

It is certified that error appears in the above-identified patent and that said Letters Patent is hereby corrected as shown below:

In column 11, after line 2, kindly change
" $\hat{A}_n = (A_{n-4} + 2A_{n-3} + 2A_{n-1} + 2A_{-1} + 2A_n + 2A_{n+1} + 2A_{n+2} + 2A_{n+3} + A_{n+4})/16,$ "

to

-- $\hat{A}_n = (A_{n-4} + 2A_{n-3} + 2A_{n-2} + 2A_{n-1} + 2A_n + 2A_{n+1} + 2A_{n+2} + 2A_{n+3} + A_{n+4})/16,$ --.

Claim 40
In column 26, line 28 (the 2nd line of claim 40), kindly change "defied by" to --defined by--.

Signed and Sealed this

Thirteenth Day of March, 2007

JON W. DUDAS
*Director of the United States Patent and Trademark Office*